(12) United States Patent
Cappello et al.

(10) Patent No.: US 11,500,459 B2
(45) Date of Patent: Nov. 15, 2022

(54) DATA PROCESSING APPARATUS AND METHOD

(71) Applicant: Sony Interactive Entertainment Inc., Tokyo (JP)

(72) Inventors: Fabio Cappello, Zurich (CH); Alexei Smith, London (GB); Maria Chiara Monti, London (GB)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 17/361,495

(22) Filed: Jun. 29, 2021

(65) Prior Publication Data

US 2022/0011860 A1 Jan. 13, 2022

(30) Foreign Application Priority Data

Jul. 7, 2020 (GB) .................................... 2010438

(51) Int. Cl.

| | |
|---|---|
| *G06F 3/01* | (2006.01) |
| *G06F 3/04842* | (2022.01) |
| *G06F 3/16* | (2006.01) |
| *G06T 13/40* | (2011.01) |
| *G06T 19/00* | (2011.01) |
| *H04N 13/344* | (2018.01) |

(52) U.S. Cl.
CPC .......... *G06F 3/013* (2013.01); *G06F 3/04842* (2013.01); *G06F 3/165* (2013.01); *G06T 13/40* (2013.01); *G06T 19/00* (2013.01); *G06T 2219/024* (2013.01); *H04N 13/344* (2018.05)

(58) Field of Classification Search
CPC ............ G02B 2027/014; G02B 27/017; G02B 2027/0178; G02B 2027/0187; G06F 3/011; G06F 3/013; G06F 3/16; G06F 3/165; G06F 3/167; G06F 3/0304; G06F 3/04842; G06F 2203/04802; G06T 13/40; G06T 19/00; G06T 19/006; G06T 19/20; G06T 2219/024; H04N 13/344

See application file for complete search history.

(56) References Cited

U.S. PATENT DOCUMENTS

| | | | |
|---|---|---|---|
| 2015/0316982 A1 | 11/2015 | Miller | |
| 2017/0076503 A1* | 3/2017 | Tamaoki | ................. G06F 3/017 |
| 2017/0262154 A1* | 9/2017 | Black | ..................... G06F 3/012 |
| 2018/0095542 A1* | 4/2018 | Mallinson | ............ G06T 19/006 |

(Continued)

OTHER PUBLICATIONS

Extended European Search Report for corresponding EP Application No. 21275078.0, 11 pages, dated Dec. 2, 2021.

(Continued)

*Primary Examiner* — Michael J Eurice
(74) *Attorney, Agent, or Firm* — Matthew B. Dernier, Esq.

(57) ABSTRACT

A data processing apparatus includes processing circuitry to generate at least one of video content and audio content for a virtual reality environment, input circuitry to receive gaze data for two or more users indicative of a gaze point for each user with respect to the virtual reality environment, and selection circuitry to select at least one object in the virtual reality environment in dependence upon a number of the gaze points corresponding to the object, in which the processing circuitry is configured to adapt at least one of the video content and the audio content in response to the selection of the object.

21 Claims, 8 Drawing Sheets

(56) References Cited

U.S. PATENT DOCUMENTS

2019/0025586 A1\* 1/2019 Sawaki ................... G06F 3/013
2019/0046044 A1\* 2/2019 Tzvieli ............... A61B 5/14552
2019/0240569 A1\* 8/2019 Kuwatani ............... A63F 13/25
2020/0410766 A1\* 12/2020 Swaminathan ......... G06T 17/00
2022/0006813 A1\* 1/2022 Jorasch ................ H04W 12/33

OTHER PUBLICATIONS

Combined Search and Examination Report for corresponding GB Application No. GB2010438.6, 13 pages, dated Apr. 7, 2021.
Margarita Vinnikov, et al., "Gaze-Contingent Auditory Displays for Improved Spatial Attention in Virtual Reality," ACM Transactions on Computer-Human Interaction, vol. 24, No. 3, Article 19, pp. 1-38, Apr. 2017.
Tracy Jenkin, et al., "EyeView: Focus+Context Views for large Group Video Conferences," Late Breaking Results Posters Human Media Lab, pp. 1497-1500, Apr. 2-7, 2005.

\* cited by examiner

LEFT　　　　　　　RIGHT

DATA PROCESSING APPARATUS AND METHOD

BACKGROUND OF THE INVENTION

Field of the Invention

The present disclosure relates to apparatus and methods. In particular, the present disclosure relates to data processing apparatus and methods that use gaze data from gaze tracking systems to generate audio and/or video content.

Description of the Prior Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Gaze tracking systems are used to identify a location of a subject's gaze within an environment; in many cases, this location may be a position on a display screen that is being viewed by the subject. In a number of existing arrangements, this is performed using one or more inwards-facing cameras directed towards the subject's eye (or eyes) in order to determine a direction in which the eyes are oriented at any given time. Having identified the orientation of the eye, a gaze direction can be determined and a focal region may be determined as the intersection of the gaze direction of each eye.

One application for which gaze tracking is considered of particular use is that of use in head-mountable display units (HMDs). The use in HMDs may be of particular benefit owing to the close proximity of inward-facing cameras to the user's eyes, allowing the tracking to be performed much more accurately and precisely than in arrangements in which it is not possibly to provide the cameras with such proximity.

By utilising gaze detection techniques, it may be possible to provide a more efficient and/or effective processing method for generating content or interacting with devices.

For example, gaze tracking may be used to provide user inputs or to assist with such inputs—a continued gaze at a location may act as a selection, or a gaze towards a particular object accompanied by another input (such as a button press) may be considered as a suitable input. This may be more effective as an input method in some embodiments, particularly in those in which a controller is not provided or when a user has limited mobility.

Foveal rendering is an example of a use for the results of a gaze tracking process in order to improve the efficiency of a content generation process. Foveal rendering is rendering that is performed so as to exploit the fact that human vision is only able to identify high detail in a narrow region (the fovea), with the ability to discern detail tailing off sharply outside of this region.

In such methods, a portion of the display is identified as being an area of focus in accordance with the user's gaze direction. This portion of the display is supplied with high-quality image content, while the remaining areas of the display are provided with lower-quality (and therefore less resource intensive to generate) image content. This can lead to a more efficient use of available processing resources without a noticeable degradation of image quality for the user.

It is therefore considered advantageous to be able to improve gaze tracking methods, and/or apply the results of such methods in an improved manner. It is in the context of such advantages that the present disclosure arises.

SUMMARY OF THE INVENTION

Various aspects and features of the present invention are defined in the appended claims and within the text of the accompanying description.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DESCRIPTION OF THE EMBODIMENTS

Figure 1:
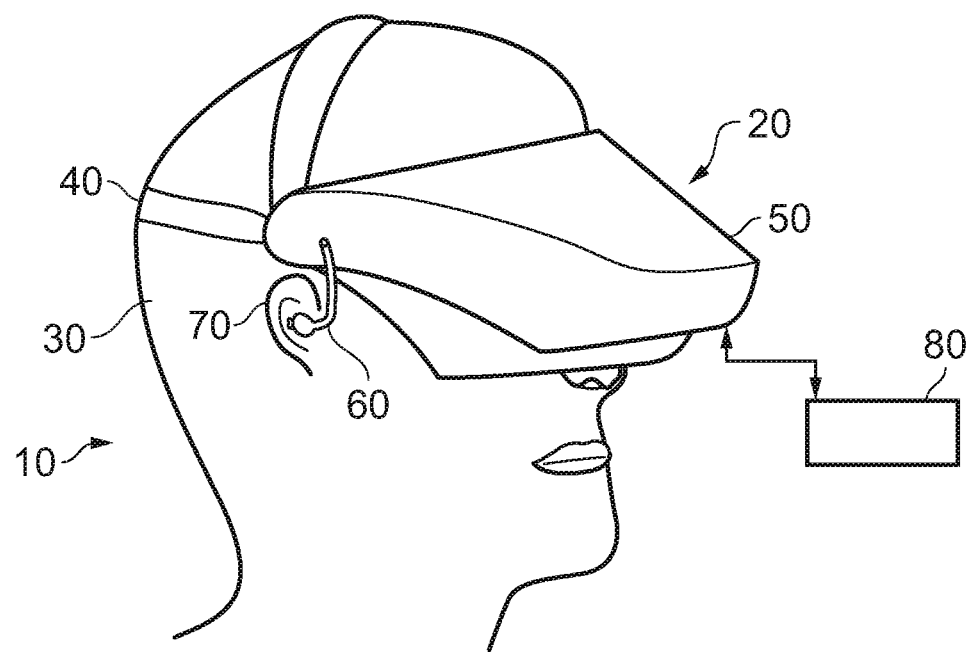
FIG. 1 schematically illustrates an HMD worn by a user.

Referring now to the drawings, wherein like reference numerals designate identical or corresponding parts throughout the several views, in FIG. 1 a user 10 is wearing an HMD 20 (as an example of a generic head-mountable apparatus—other examples including audio headphones or a head-mountable light source) on the user's head 30. The HMD comprises a frame 40, in this example formed of a rear strap and a top strap, and a display portion 50. As noted above, many gaze tracking arrangements may be considered particularly suitable for use in HMD systems; however, use with such an HMD system should not be considered essential.

Note that the HMD of FIG. 1 may comprise further features, to be described below in connection with other drawings, but which are not shown in FIG. 1 for clarity of this initial explanation.

The HMD of FIG. 1 completely (or at least substantially completely) obscures the user's view of the surrounding environment. All that the user can see is the pair of images displayed within the HMD, as supplied by an external processing device such as a games console in many embodiments. Of course, in some embodiments images may instead (or additionally) be generated by a processor or obtained from memory located at the HMD itself.

The HMD has associated headphone audio transducers or earpieces 60 which fit into the user's left and right ears 70. The earpieces 60 replay an audio signal provided from an external source, which may be the same as the video signal source which provides the video signal for display to the user's eyes.

The combination of the fact that the user can see only what is displayed by the HMD and, subject to the limitations of the noise blocking or active cancellation properties of the earpieces and associated electronics, can hear only what is provided via the earpieces, mean that this HMD may be considered as a so-called "full immersion" HMD. Note however that in some embodiments the HMD is not a full immersion HMD, and may provide at least some facility for the user to see and/or hear the user's surroundings. This could be by providing some degree of transparency or partial transparency in the display arrangements, and/or by projecting a view of the outside (captured using a camera, for example a camera mounted on the HMD) via the HMD's displays, and/or by allowing the transmission of ambient sound past the earpieces and/or by providing a microphone to generate an input sound signal (for transmission to the earpieces) dependent upon the ambient sound.

A front-facing camera 122 may capture images to the front of the HMD, in use. Such images may be used for head tracking purposes, in some embodiments, while it may also be suitable for capturing images for an augmented reality (AR) style experience. A Bluetooth® antenna 124 may provide communication facilities or may simply be arranged as a directional antenna to allow a detection of the direction of a nearby Bluetooth® transmitter.

In operation, a video signal is provided for display by the HMD. This could be provided by an external video signal source 80 such as a video games machine or data processing apparatus (such as a personal computer), in which case the signals could be transmitted to the HMD by a wired or a wireless connection. Examples of suitable wireless connections include Bluetooth® connections. Audio signals for the earpieces 60 can be carried by the same connection. Similarly, any control signals passed from the HMD to the video (audio) signal source may be carried by the same connection. Furthermore, a power supply 83 (including one or more batteries and/or being connectable to a mains power outlet) may be linked by a cable to the HMD. Note that the power supply 83 and the video signal source 80 may be separate units or may be embodied as the same physical unit. There may be separate cables for power and video (and indeed for audio) signal supply, or these may be combined for carriage on a single cable (for example, using separate conductors, as in a USB cable, or in a similar way to a "power over Ethernet" arrangement in which data is carried as a balanced signal and power as direct current, over the same collection of physical wires). The video and/or audio signal may be carried by, for example, an optical fibre cable. In other embodiments, at least part of the functionality associated with generating image and/or audio signals for presentation to the user may be carried out by circuitry and/or processing forming part of the HMD itself. A power supply may be provided as part of the HMD itself.

Some embodiments of the invention are applicable to an HMD having at least one electrical and/or optical cable linking the HMD to another device, such as a power supply and/or a video (and/or audio) signal source. So, embodiments of the invention can include, for example:

(a) an HMD having its own power supply (as part of the HMD arrangement) but a cabled connection to a video and/or audio signal source;

(b) an HMD having a cabled connection to a power supply and to a video and/or audio signal source, embodied as a single physical cable or more than one physical cable;

(c) an HMD having its own video and/or audio signal source (as part of the HMD arrangement) and a cabled connection to a power supply; or (d) an HMD having a wireless connection to a video and/or audio signal source and a cabled connection to a power supply.

If one or more cables are used, the physical position at which the cable enters or joins the HMD is not particularly important from a technical point of view. Aesthetically, and to avoid the cable(s) brushing the user's face in operation, it would normally be the case that the cable(s) would enter or join the HMD at the side or back of the HMD (relative to the orientation of the user's head when worn in normal operation). Accordingly, the position of the cables relative to the HMD in FIG. 1 should be treated merely as a schematic representation.

Accordingly, the arrangement of FIG. 1 provides an example of a head-mountable display system comprising a frame to be mounted onto an observer's head, the frame defining one or two eye display positions which, in use, are positioned in front of a respective eye of the observer and a display element (display unit) mounted with respect to each of the eye display positions, the display element providing a virtual image of a video display of a video signal from a video signal source to that eye of the observer.

FIG. 1 shows just one example of an HMD. Other formats are possible: for example an HMD could use a frame more similar to that associated with conventional eyeglasses, namely a substantially horizontal leg extending back from the display portion to the top rear of the user's ear, possibly curling down behind the ear. In other (not full immersion) examples, the user's view of the external environment may not in fact be entirely obscured; the displayed images could be arranged so as to be superposed (from the user's point of view) over the external environment. An example of such an arrangement will be described below with reference to FIG. 4.

Figure 2:
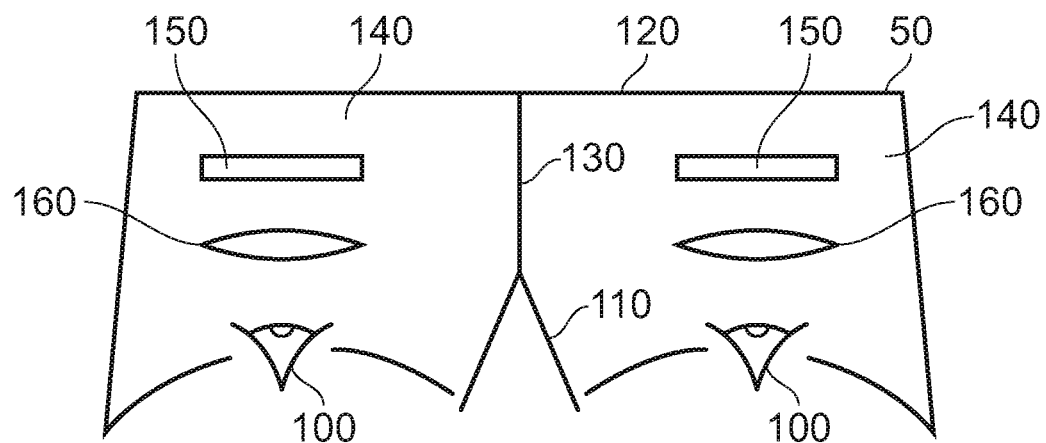
FIG. 2 is a schematic plan view of an HMD.

In the example of FIG. 1, a separate respective display is provided for each of the user's eyes. A schematic plan view of how this is achieved is provided as FIG. 2, which illustrates the positions 100 of the user's eyes and the relative position 110 of the user's nose. The display portion 50, in schematic form, comprises an exterior shield 120 to mask ambient light from the user's eyes and an internal shield 130 which prevents one eye from seeing the display intended for the other eye. The combination of the user's face, the exterior shield 120 and the interior shield 130 form two compartments 140, one for each eye. In each of the compartments there is provided a display element (display unit) 150 and one or more optical elements 160. The way in which the display element and the optical element(s) cooperate to provide a display to the user will be described with reference to FIG. 3.

Figure 3:
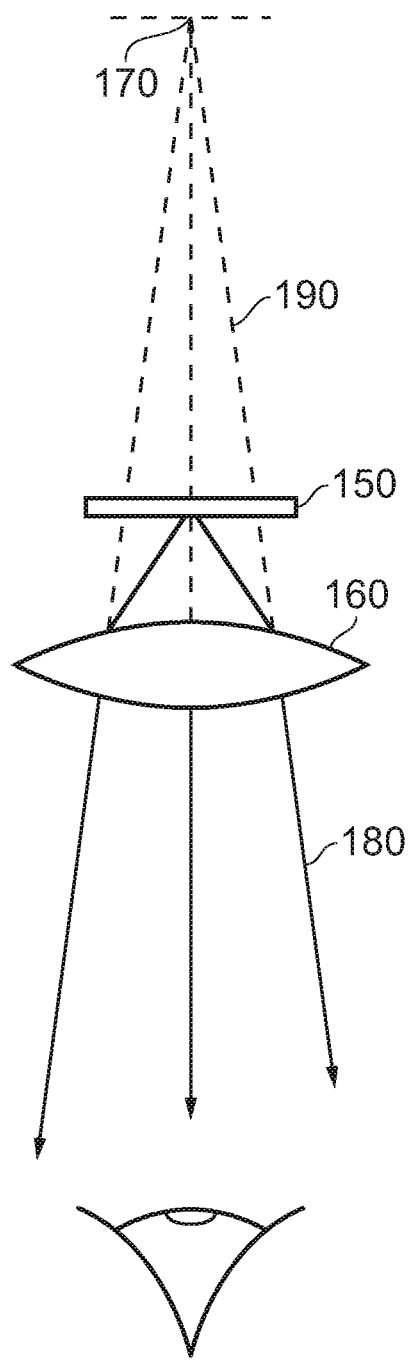
FIG. 3 schematically illustrates the formation of a virtual image by an HMD.

Referring to FIG. 3, the display element (display unit) 150 generates a displayed image which is (in this example) refracted by the optical elements 160 (shown schematically as a convex lens but which could include compound lenses or other elements) so as to generate a virtual image 170 which appears to the user to be larger than and significantly further away than the real image generated by the display element 150. As an example, the virtual image may have an apparent image size (image diagonal) of more than 1 m and may be disposed at a distance of more than 1 m from the user's eye (or from the frame of the HMD). In general terms, depending on the purpose of the HMD, it is desirable to have the virtual image disposed a significant distance from the user. For example, if the HMD is for viewing movies or the like, it is desirable that the user's eyes are relaxed during such viewing, which requires a distance (to the virtual image) of at least several metres. In FIG. 3, solid lines (such as the line 180) are used to denote real optical rays, whereas broken lines (such as the line 190) are used to denote virtual rays.

Figure 4:
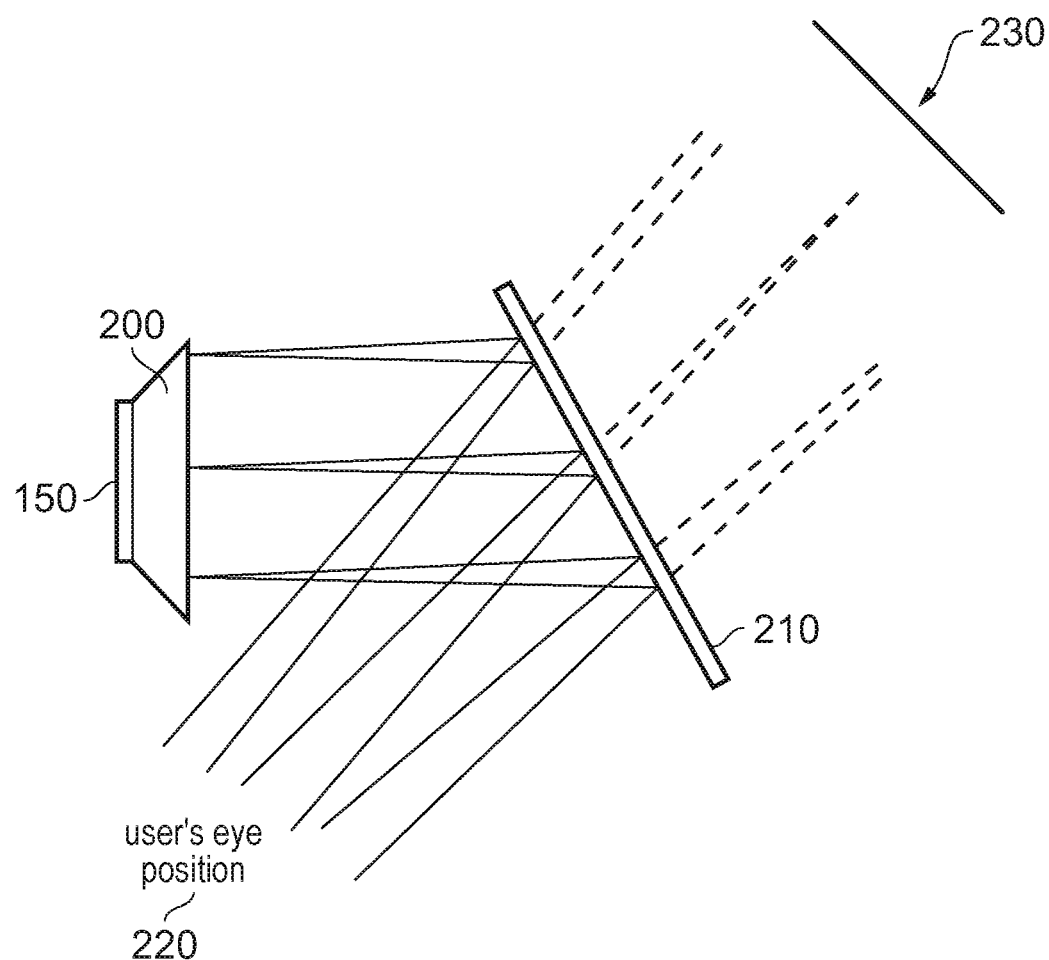
FIG. 4 schematically illustrates another type of display for use in an HMD.

An alternative arrangement is shown in FIG. 4. This arrangement may be used where it is desired that the user's view of the external environment is not entirely obscured. However, it is also applicable to HMDs in which the user's external view is wholly obscured. In the arrangement of FIG. 4, the display element (display unit) 150 and optical elements 200 cooperate to provide an image which is projected onto a mirror 210, which deflects the image towards the user's eye position 220. The user perceives a virtual image to be located at a position 230 which is in front of the user and at a suitable distance from the user.

In the case of an HMD in which the user's view of the external surroundings is entirely obscured, the mirror 210 can be a substantially 100% reflective mirror. The arrangement of FIG. 4 then has the advantage that the display element and optical elements can be located closer to the centre of gravity of the user's head and to the side of the user's eyes, which can produce a less bulky HMD for the user to wear. Alternatively, if the HMD is designed not to completely obscure the user's view of the external environment, the mirror 210 can be made partially reflective so that the user sees the external environment, through the mirror 210, with the virtual image superposed over the real external environment.

Figure 5:
FIG. 5 schematically illustrates a pair of stereoscopic images.

In the case where separate respective displays are provided for each of the user's eyes, it is possible to display stereoscopic images. An example of a pair of stereoscopic images for display to the left and right eyes is shown in FIG. 5. The images exhibit a lateral displacement relative to one another, with the displacement of image features depending upon the (real or simulated) lateral separation of the cameras by which the images were captured, the angular convergence of the cameras and the (real or simulated) distance of each image feature from the camera position.

Note that the lateral displacements in FIG. 5 could in fact be the other way round, which is to say that the left eye image as drawn could in fact be the right eye image, and the right eye image as drawn could in fact be the left eye image. This is because some stereoscopic displays tend to shift objects to the right in the right eye image and to the left in the left eye image, so as to simulate the idea that the user is looking through a stereoscopic window onto the scene beyond. However, some HMDs use the arrangement shown in FIG. 5 because this gives the impression to the user that the user is viewing the scene through a pair of binoculars. The choice between these two arrangements is at the discretion of the system designer.

In some situations, an HMD may be used simply to view movies and the like. In this case, there is no change required to the apparent viewpoint of the displayed images as the user turns the user's head, for example from side to side. In other uses, however, such as those associated with virtual reality (VR) or augmented reality (AR) systems, the user's viewpoint needs to track movements with respect to a real or virtual space in which the user is located.

As mentioned above, in some uses of the HMD, such as those associated with virtual reality (VR) or augmented reality (AR) systems, the user's viewpoint needs to track movements with respect to a real or virtual space in which the user is located.

This tracking is carried out by detecting motion of the HMD and varying the apparent viewpoint of the displayed images so that the apparent viewpoint tracks the motion. The detection may be performed using any suitable arrangement (or a combination of such arrangements). Examples include the use of hardware motion detectors (such as accelerometers or gyroscopes), external cameras operable to image the HMD, and outwards-facing cameras mounted onto the HMD.

Turning to gaze tracking in such an arrangement, FIG. 6 schematically illustrates two possible arrangements for performing eye tracking on an HMD. The cameras provided within such arrangements may be selected freely so as to be able to perform an effective eye-tracking method. In some existing arrangements, visible light cameras are used to capture images of a user's eyes. Alternatively, infra-red (IR) cameras are used so as to reduce interference either in the captured signals or with the user's vision should a corresponding light source be provided, or to improve performance in low-light conditions.

Figure 6A:
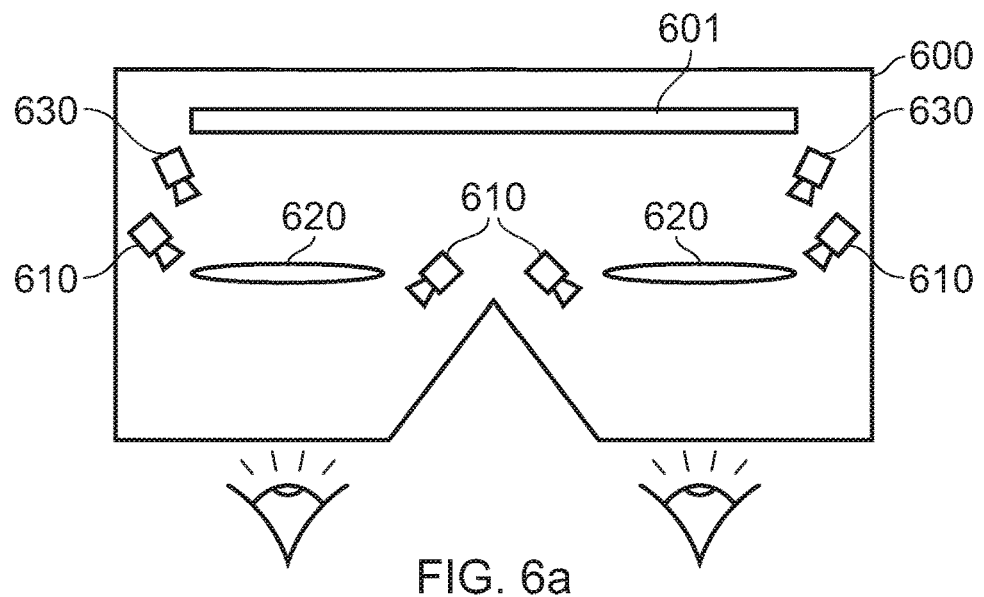
FIG. 6a schematically illustrates a plan view of an HMD.

FIG. 6a shows an example of a gaze tracking arrangement in which the cameras are arranged within an HMD so as to capture images of the user's eyes from a short distance. This may be referred to as near-eye tracking, or head-mounted tracking.

In this example, an HMD 600 with a display element (display unit) 601 is provided with cameras 610 that are each arranged so as to directly capture one or more images of a respective one of the user's eyes using an optical path that does not include the lens 620. This may be advantageous in that distortion in the captured image due to the optical effect of the lens is able to be avoided. Four cameras 610 are shown here as examples of possible positions that eye-tracking cameras may provided, although it should be considered that any number of cameras may be provided in any suitable location so as to be able to image the corresponding eye effectively. For example, only one camera may be provided per eye or more than two cameras may be provided for each eye.

However it is considered that in a number of embodiments it is advantageous that the cameras are instead arranged so as to include the lens 620 in the optical path used to capture images of the eye. Examples of such positions are shown by the cameras 630. While this may result in processing being required to enable suitably accurate tracking to be performed, due to the deformation in the captured image due to the lens, this may be performed relatively simply due to the fixed relative positions of the corresponding cameras and lenses. An advantage of including the lens within the optical path may be that of simplifying the physical constraints upon the design of an HMD, for example.

Figure 6B:
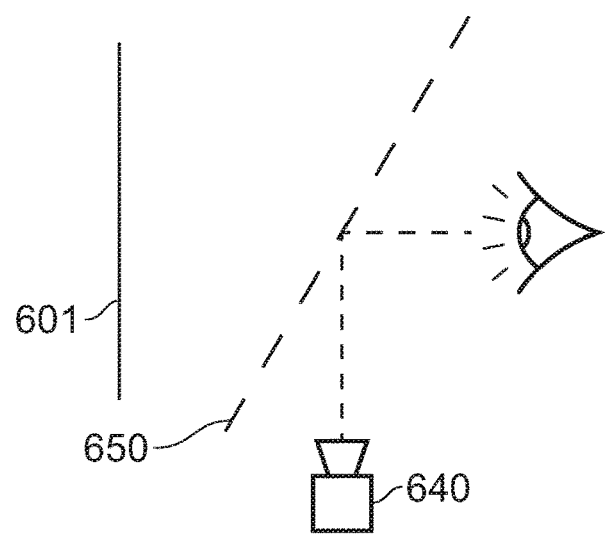
FIG. 6b schematically illustrates a near-eye tracking arrangement.

FIG. 6b shows an example of a gaze tracking arrangement in which the cameras are instead arranged so as to indirectly capture images of the user's eyes. Such an arrangement may be particularly suited to use with IR or otherwise non-visible light sources, as will be apparent from the below description.

FIG. 6b includes a mirror 650 arranged between a display 601 and the viewer's eye (of course, this can be extended to or duplicated at the user's other eye as appropriate). For the sake of clarity, any additional optics (such as lenses) are omitted in this Figure—it should be appreciated that they may be present at any suitable position within the depicted arrangement. The mirror 650 in such an arrangement is selected so as to be partially transmissive; that is, the mirror 650 should be selected so as to enable the camera 640 to obtain an image of the user's eye while the user views the display 601. One method of achieving this is to provide a mirror 650 that is reflective to IR wavelengths but transmissive to visible light—this enables IR light used for tracking to be reflected from the user's eye towards the camera 640 while the light emitted by the display 601 passes through the mirror uninterrupted.

Such an arrangement may be advantageous in that the cameras may be more easily arranged out of view of the user, for instance. Further to this, improvements to the accuracy of the eye tracking may be obtained due to the fact that the camera captures images from a position that is effectively (due to the reflection) along the axis between the user's eye and the display.

Figure 7:
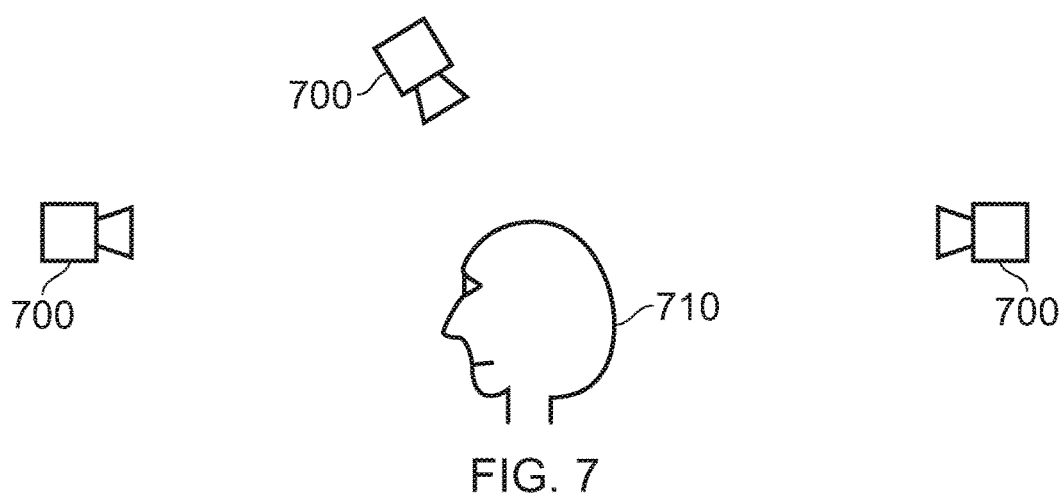
FIG. 7 schematically illustrates a remote tracking arrangement.

Of course, eye-tracking arrangements need not be implemented in a head-mounted or otherwise near-eye fashion as has been described above. For example, FIG. 7 schematically illustrates a system in which a camera is arranged to capture images of the user from a distance; this distance may vary during tracking, and may take any value in dependence upon the parameters of the tracking system. For example, this distance may be thirty centimetres, a metre, five metres, ten metres, or indeed any value so long as the tracking is not performed using an arrangement that is affixed to the user's head.

In FIG. 7, an array of cameras 700 is provided that together provide multiple views of the user 710. These cameras are configured to capture information identifying at least the direction in which a user's 710 eyes are focused, using any suitable method. For example, IR cameras may be utilised to identify reflections from the user's 710 eyes. An array of cameras 700 may be provided so as to provide multiple views of the user's 710 eyes at any given time, or may be provided so as to simply ensure that at any given time at least one camera 700 is able to view the user's 710 eyes. It is apparent that in some use cases it may not be necessary to provide such a high level of coverage and instead only one or two cameras 700 may be used to cover a smaller range of possible viewing directions of the user 710.

Of course, the technical difficulties associated with such a long-distance tracking method may be increased; higher resolution cameras may be required, as may stronger light sources for generating IR light, and further information (such as head orientation of the user) may need to be input to determine a focus of the user's gaze. The specifics of the arrangement may be determined in dependence upon a required level of robustness, accuracy, size, and/or cost, for example, or any other design consideration.

Despite technical challenges including those discussed above, such tracking methods may be considered beneficial in that they allow a greater range of interactions for a user—rather than being limited to HMD viewing, gaze tracking may be performed for a viewer of a television, for instance.

Rather than varying only in the location in which cameras are provided, eye-tracking arrangements may also differ in where the processing of the captured image data to determine tracking data is performed.

Figure 8:
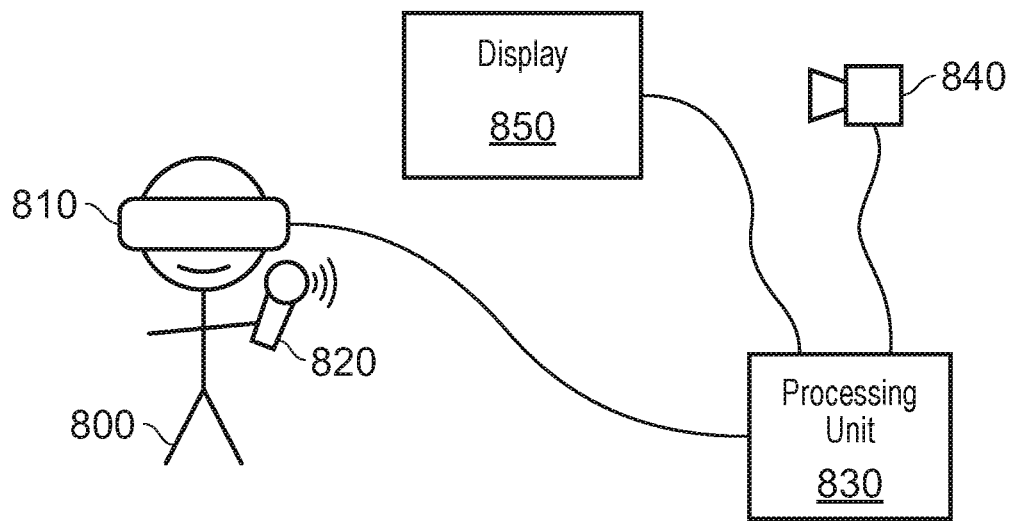
FIG. 8 schematically illustrates a gaze tracking environment.

FIG. 8 schematically illustrates an environment in which an eye-tracking process may be performed. In this example, the user 800 is using an HMD 810 that is associated with the processing unit 830, such as a games console, with the peripheral 820 allowing a user 800 to input commands to control the processing. The HMD 810 may perform eye tracking in line with an arrangement exemplified by FIG. 6a or 6b, for example—that is, the HMD 810 may comprise one or more cameras operable to capture images of either or both of the user's 800 eyes. The processing unit 830 may be operable to generate content for display at the HMD 810; although some (or all) of the content generation may be performed by processing units within the HMD 810.

The arrangement in FIG. 8 also comprises a camera 840, located outside of the HMD 810, and a display 850. In some cases, the camera 840 may be used for performing tracking of the user 800 while using the HMD 810, for example to identify body motion or a head orientation. The camera 840 and display 850 may be provided as well as or instead of the HMD 810; for example these may be used to capture images of a second user and to display images to that user while the first user 800 uses the HMD 810, or the first user 800 may be tracked and view content with these elements instead of the HMD 810. That is to say, the display 850 may be operable to display generated content provided by the processing unit 830 and the camera 840 may be operable to capture images of one or more users' eyes to enable eye-tracking to be performed.

While the connections shown in FIG. 8 are shown by lines, this should of course not be taken to mean that the connections should be wired; any suitable connection method, including wireless connections such as wireless networks or Bluetooth®, may be considered suitable. Similarly, while a dedicated processing unit 830 is shown in FIG. 8 it is also considered that the processing may in some embodiments be performed in a distributed manner—such as using a combination of two or more of the HMD 810, one or more processing units, remote servers (cloud processing), or games consoles.

The processing required to generate tracking information from captured images of the user's 800 eye or eyes may be performed locally by the HMD 810, or the captured images or results of one or more detections may be transmitted to an external device (such as a the processing unit 830) for processing. In the former case, the HMD 810 may output the results of the processing to an external device for use in an image generation process if such processing is not performed exclusively at the HMD 810. In embodiments in which the HMD 810 is not present, captured images from the camera 840 are output to the processing unit 830 for processing.

Figure 9:
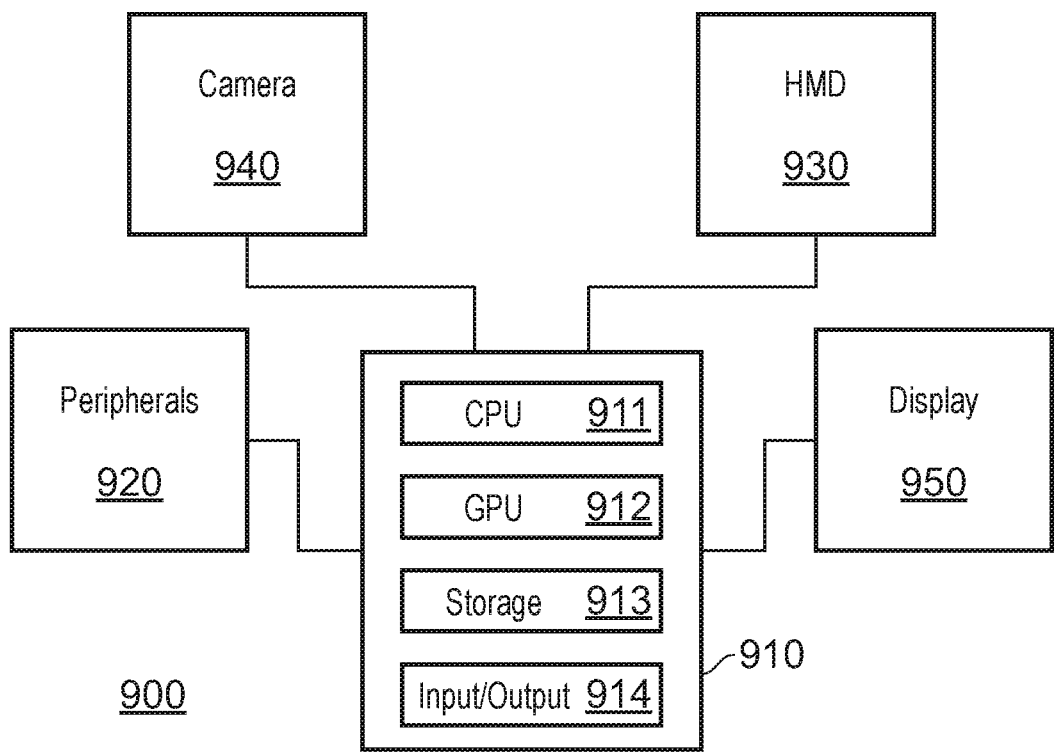
FIG. 9 schematically illustrates a gaze tracking system.

FIG. 9 schematically illustrates a system for performing one or more eye tracking processes, for example in an embodiment such as that discussed above with reference to FIG. 8. The system 900 comprises a processing device 910, one or more peripherals 920, an HMD 930, a camera 940, and a display 950. Of course, not all elements need be present within the system 900 in a number of embodiments—for instance, if the HMD 930 is present then it is considered that the camera 940 may be omitted as it is unlikely to be able to capture images of the user's eyes.

As shown in FIG. 9, the processing device 910 may comprise one or more of a central processing unit (CPU) 911, a graphics processing unit (GPU) 912, storage (such as a hard drive, or any other suitable data storage medium) 913, and an input/output 914. These units may be provided in the form of a personal computer, a games console, or any other suitable processing device.

For example, the CPU 911 may be configured to generate tracking data from one or more input images of the user's eyes from one or more cameras, or from data that is indicative of a user's eye direction. This may be data that is obtained from processing images of the user's eye at a remote device, for example. Of course, should the tracking data be generated elsewhere then such processing would not be necessary at the processing device 910.

The GPU 912 may be configured to generate content for display to the user on which the eye tracking is being performed. In some embodiments, the content itself may be modified in dependence upon the tracking data that is obtained—an example of this is the generation of content in accordance with a foveal rendering technique. Of course, such content generation processes may be performed elsewhere—for example, an HMD 930 may have an on-board GPU that is operable to generate content in dependence upon the eye tracking data.

The storage 913 may be provided so as to store any suitable information. Examples of such information include program data, content generation data, and eye tracking model data. In some cases, such information may be stored remotely such as on a server, and as such a local storage 913 may not be required—the discussion of the storage 913 should therefore be considered to refer to local (and in some cases removable storage media) or remote storage.

The input/output 914 may be configured to perform any suitable communication as appropriate for the processing device 910. Examples of such communication include the transmission of content to the HMD 930 and/or display 950, the reception of eye-tracking data and/or images from the HMD 930 and/or the camera 940, and communication with one or more remote servers (for example, via the internet).

As discussed above, the peripherals 920 may be provided to allow a user to provide inputs to the processing device 910 in order to control processing or otherwise interact with generated content. This may be in the form of button presses or the like, or alternatively via tracked motion to enable gestures to be used as inputs.

The HMD 930 may comprise a number of sub-elements, which have been omitted from FIG. 9 for the sake of clarity. Of course, the HMD 930 should comprise a display unit operable to display images to a user. In addition to this, the HMD 930 may comprise any number of suitable cameras for eye tracking (as discussed above), in addition to one or more processing units that are operable to generate content for display and/or generate eye tracking data from the captured images.

The camera 940 and display 950 may be configured in accordance with the discussion of the corresponding elements above with respect to FIG. 8.

Turning to the image capture process upon which the eye tracking is based, examples of different cameras are discussed. The first of these is a standard camera, which captures a sequence of images of the eye that may be processed to determine tracking information. The second is that of an event camera, which instead generates outputs in accordance with observed changes in brightness.

It is more common to use standard cameras in such tracking arrangements, given that they are widely available and often relatively cheap to produce. 'Standard cameras' here refer to cameras which capture images of the environment at predetermined intervals which can be combined to generate video content. For example, a typical camera of this type may capture thirty images (frames) each second, and these images may be output to a processing unit for feature detection or the like to be performed so as to enable tracking of the eye.

Such a camera comprises a light-sensitive array that is operable to record light information during an exposure time, with the exposure time being controlled by a shutter speed (the speed of which dictates the frequency of image capture). The shutter may be configured as a rolling shutter (line-by-line reading of the captured information) or a global shutter (reading the captured information of the whole frame simultaneously), for example.

However, in some arrangements it may be considered advantageous to instead use an event camera, which may also be referred to as a dynamic vision sensor. Such cameras do not require a shutter as described above, and instead each element of the light-sensitive array (often referred to as a pixel) is configured to output a signal at any time a threshold brightness change is observed. This means that images are not output in the traditional sense—however an image reconstruction algorithm may be applied that is able to generate an image from the signals output by an event camera.

While there is an increased computational complexity for generating an image from such data, the output of the event camera can be used for tracking without any image generation. One example of how this is performed is that of using an IR-sensitive event camera; when imaged using IR light, the pupil of the human eye displays a much higher level of brightness than the surrounding features. By selecting an appropriate threshold brightness, the motion of the pupil would be expected to trigger events (and corresponding outputs) at the sensor.

Independent of the type of camera that is selected, in many cases it may be advantageous to provide illumination to the eye in order to obtain a suitable image. One example of this is the provision of an IR light source that is configured to emit light in the direction of one or both of the user's eyes; an IR camera may then be provided that is able to detect reflections from the user's eye in order to generate an image. IR light may be preferable as it is invisible to the human eye, and as such does not interfere with normal viewing of content by the user, but it is not considered to be essential. In some cases, the illumination may be provided by a light source that is affixed to the imaging device, while in other embodiments it may instead be that the light source is arranged away from the imaging device.

Figure 10:
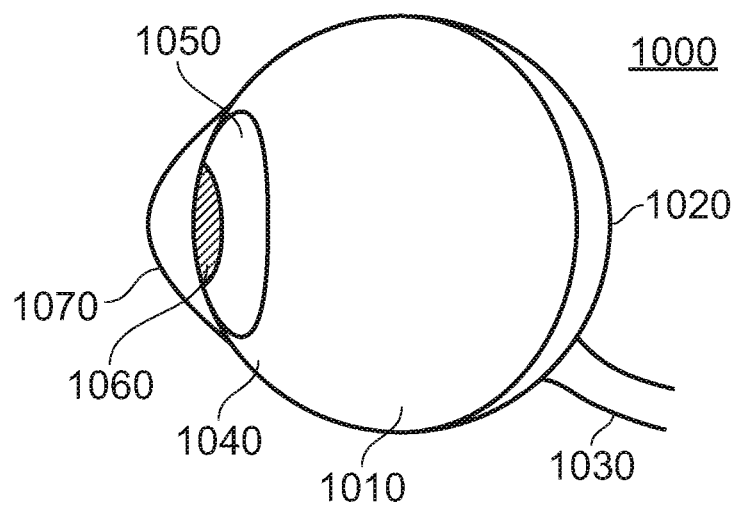
FIG. 10 schematically illustrates a human eye.

As suggested in the discussion above, the human eye does not have a uniform structure; that is, the eye is not a perfect sphere, and different parts of the eye have different characteristics (such as varying reflectance or colour). FIG. 10 shows a simplified side view of the structure of a typical eye 1000; this Figure has omitted features such as the muscles which control eye motion for the sake of clarity.

The eye 1000 is formed of a near-spherical structure filled with an aqueous solution 1010, with a retina 1020 formed on the rear surface of the eye 1000. The optic nerve 1030 is connected at the rear of the eye 1000. Images are formed on the retina 1020 by light entering the eye 1000, and corresponding signals carrying visual information are transmitted from the retina 1020 to the brain via the optic nerve 1030.

Turning to the front surface of the eye 1000, the sclera 1040 (commonly referred to as the white of the eye) surrounds the iris 1050. The iris 1050 controls the size of the pupil 1060, which is an aperture through which light enters the eye 1000. The iris 1050 and pupil 1060 are covered by the cornea 1070, which is a transparent layer which can refract light entering the eye 1000. The eye 1000 also comprises a lens (not shown) that is present behind the iris 1050 that may be controlled to adjust the focus of the light entering the eye 1000.

Figure 11:
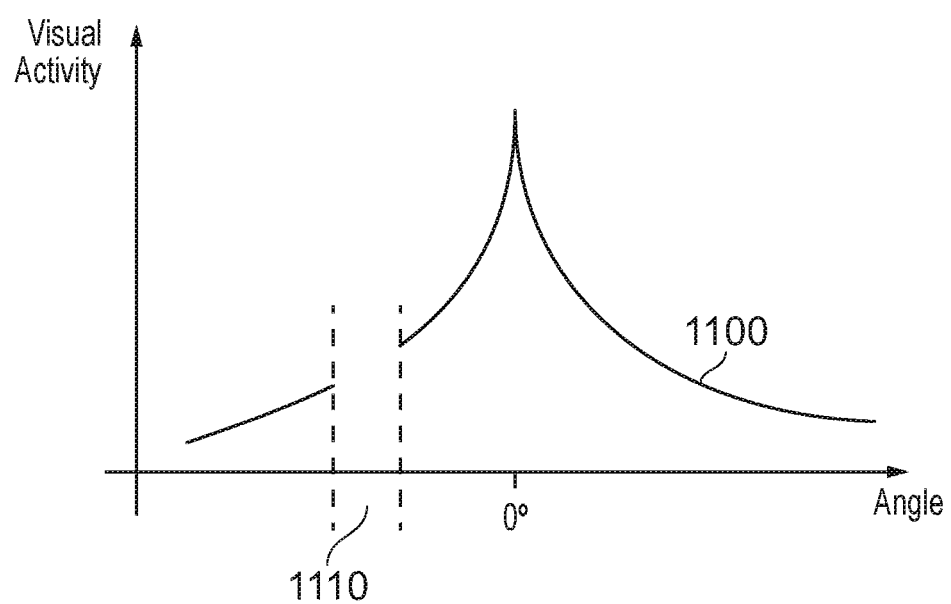
FIG. 11 schematically illustrates a graph of human visual acuity.

The structure of the eye is such that there is an area of high visual acuity (the fovea), with a sharp drop off either side of this. This is illustrated by the curve 1100 of FIG. 11, with the peak in the centre representing the foveal region. The area 1110 is the 'blind spot'; this is an area in which the eye has no visual acuity as it corresponds to the area where the optic nerve meets the retina. The periphery (that is, the viewing angles furthest from the fovea) is not particularly sensitive colour or detail, and instead is used to detect motion.

As has been discussed above, foveal rendering is a rendering technique that takes advantage of the relatively small size (around 2.5 degrees) of the fovea and the sharp fall-off in acuity outside of that.

The eye undergoes a large amount of motion during viewing, and this motion may be categorised into one of a number of categories.

A saccadic eye movement is identified as a fast motion of the eye in which the eye moves in a ballistic manner to change a point of fixation. A saccadic eye movement may be considered as being a ballistic movement, in that once the movement of the eye has been initiated to change a point of focus from a current point of focus to a target point of focus (next point of focus), the target point of focus and the direction of movement of the eye to move the point of focus to the target point of focus cannot be altered by the human visual system. Therefore at the time of initiation of the saccadic eye movement, the eye movements to be performed have already been determined and are thus said to be predetermined. During the course of the eye movement to change from the current fixation point to the next fixation point it is not possible to interrupt the eye movement, and upon reaching the target fixation point the eye remains stationary for a period of time (a fixation pause) to focus on the target fixation point before subsequent eye movement can be initiated.

It is sometimes observed that a saccade is followed by a smaller corrective saccade that is performed to bring the eye closer to the target fixation point. Such a corrective saccade typically occurs after a short period of time. As such, saccades can range in size from a small eye movement such as a corrective saccade or a small eye movement made while reading text, for example, to a much larger eye movement made when observing a surrounding environment. Saccades performed when reading text are voluntarily initiated by the human visual system, whereas when surveying a surrounding environment or viewing an image on a display unit saccades are often performed reflexively to focus on a target. Saccades may have a duration of up to approximately two hundred milliseconds, depending on a size of the angle rotated by the eye to change the position of the foveal region of the viewer's vision, but may have a duration as short as twenty milliseconds. Typical rotational velocities for a saccadic eye movement may range from fifty up to seven hundred degrees per second. The rotational velocity of the eye during a saccadic eye movement and the magnitude of the total rotation angle have a relationship in that larger rotational velocities are observed for larger rotation angles.

'Smooth pursuit' refers to a slower movement type than a saccade. Smooth pursuit is generally associated with a conscious tracking of a point of focus by a viewer, and is performed so as to maintain the position of a target within (or at least substantially within) the foveal region of the viewer's vision. This enables a high-quality view of a target of interest to be maintained in spite of motion. If the target moves too fast, then smooth pursuit may instead require a number of saccades in order to keep up; this is because smooth pursuit has a lower maximum speed, in the region of thirty degrees per second.

The vestibular-ocular reflex is a further example of eye motion. The vestibular-ocular reflex is the motion of the eyes that counteracts head motion; that is, the motion of the eyes relative to the head that enables a person to remain focused on a particular point despite moving their head.

Another type of motion is that of the vergence accommodation reflex. This is the motion that causes the eyes to rotate to converge at a point, and the corresponding adjustment of the lens within the eye to cause that point to come into focus.

Further eye motions that may be observed as a part of a gaze tracking process are those of blinks or winks, in which the eyelid covers the eyes of the user.

As discussed previously, a display unit (such as the display unit 150, 601) can be provided as part of the HMD and is configured to display images to the user wearing the HMD. Movements of the eye are performed by a user wearing an HMD whilst viewing images displayed by the HMD to move the fovea and enable detailed visual analysis of a portion of an image displayed by the HMD and such movements can be tracked by a camera and/or an event camera provided as part of an HMD. Similarly, a display unit (such as the display unit 850) can be configured to display images to a user not wearing an HMD, and a camera and/or an event camera mounted with respect to the display unit 850 so that the user is included within the field-of-view. The camera can thus be configured to capture images of the user to track the eye movements of the user while viewing the display unit. Therefore, for a given content displayed to a user, the user's eye movements can be detected, and corresponding gaze data indicative of the user's gaze point can be output.

Image-based gaze tracking techniques can be implemented using one or more cameras (and/or one or more infra-red cameras) comprising an image sensor configured to capture respective image frames at a fixed frame rate specified by a system clock (e.g. 30 frames per second). Features associated with an eye can be identified in each image frame and the positions of the features can be tracked across multiple image frames to track the user's gaze direction. The camera can thus be configured output gaze data for a user indicative of a gaze point for the user. For example, gaze tracking techniques may rely on identifying a corneal reflection and a pupil as features to track, such that a point of gaze (where the user is looking) can be calculated at fixed time intervals according to the tracked positions of these features in the image frames. In some examples, image-based gaze tracking techniques may be implemented using one or more event-cameras configured to detect events in response to changes in light incident upon an image sensor from the eye of the user. The event-camera comprises a plurality of sensor elements each capable of operating independently of the other sensor elements such that each sensor element is configured to detect an event and output a signal in response to detecting an event. Therefore, the event-camera is capable of measuring changes in light on a per-sensor element basis and generating an output signal comprising events detected by the respective sensor elements in a manner such that the event-camera can detect changes in a scene asynchronously and independently for respective sensor elements. The event-camera can thus be configured output gaze data for a user indicative of a gaze point for the user. In some examples, the event-camera may be an infra-red (IR) sensitive event-camera such that an IR light source can be used to illuminate the eye. When imaged using IR light, the pupil of the human eye typically displays a much higher level of brightness than the surrounding features.

The operations to be discussed below relate to adapting at least one of a video content and an audio content for a virtual reality environment in response to gaze data for two or more users indicative of gaze points for the two or more users with respect to the virtual reality environment. The gaze data for the two or more users can be used to identify one or more objects in the virtual reality environment that are viewed by the users. An object in the virtual reality environment that is looked at by a given number of the users can thus be identified and the audio and/or video content for the virtual reality environment can be adapted accordingly.

Figure 12A:
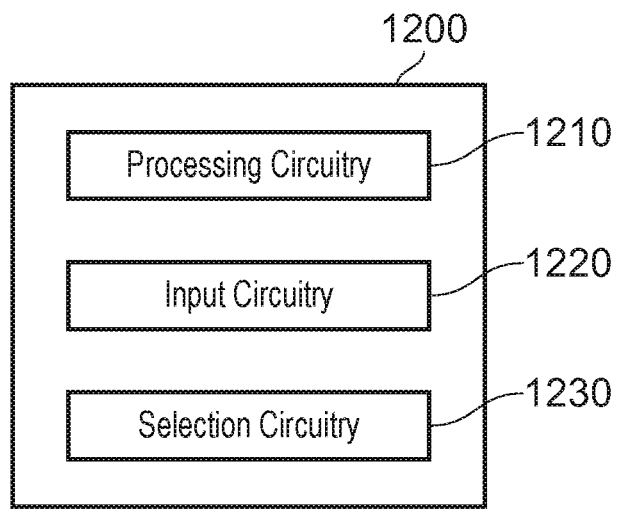
FIG. 12a schematically illustrates a data processing apparatus.

FIG. 12a schematically illustrates a data processing apparatus 1200 for selecting one or more objects in a virtual reality environment in dependence upon gaze data for two or more users and adapting at least one of video content and audio content for the virtual reality environment. In embodiments of the disclosure, the data processing apparatus 1200 comprises: processing circuitry 1210 to generate at least one of video content and audio content for a virtual reality environment; input circuitry 1220 to receive gaze data for two or more users indicative of a gaze point for each user with respect to the virtual reality environment; and selection circuitry 1230 to select at least one object in the virtual reality environment in dependence upon a number of the gaze points corresponding to the object, in which the processing circuitry 1210 is configured to adapt at least one of the video content and the audio content in response to the selection of the object.

The data processing apparatus 1200 may be provided as part of a processing device, such as the processing device 910, or as part of a server. Alternatively, the data processing apparatus 1200 may be provided as part of an HMD. In some examples, the processing circuitry 1210 may be provided as part of an HMD, and the input circuitry 1220 and the selection circuitry 1230 may be provided as part of a separate processing device (e.g. the processing device 910 or the server) configured to communicate with the HMD. In some examples, the processing circuitry 1210 may be provided as part of a game console or a personal computer, and the input circuitry 1220 and the selection circuitry 1230 may be provided as part of a remote server configured to communicate with the game console or personal computer.

The processing circuitry 1210 is configured to generate audio and/or video content for a virtual reality environment for output to a user. The user may be wearing an HMD, in which case the audio and/or video content is generated by the processing circuitry 1210 for output to the user via the HMD. For example, the HMD may comprise one or more audio output units (e.g. earphones) for outputting the audio content to the user. Alternatively, the user may be viewing a display unit (such as the display unit 850) having one or more associated audio output units (e.g. speakers) and not wearing an HMD, in which case the video content is generated by the processing circuitry 1210 for display by the display unit and the audio content is generated for output by one or more of the associated audio output units. In some examples, the functionality of the processing circuitry 1210 may be performed in a distributed manner using a combination of processing devices (for example, a combination of processing performed by an HMD and a personal computer or game console). The processing circuitry 1210 is configured to generate video content for display by at least one of a display unit (such as the display unit 850) and an HMD.

References herein to images generated by the processing circuitry 1210 refer to generating either stereoscopic images for which left images and right images are displayed to the respective eyes or generating a single image that is displayed to both eyes.

The input circuitry 1210 is configured to receive the gaze data for two or more users indicative of gaze points for the two or more users with respect to the virtual reality environment. For example, a first user and a second user may both wear respective HMDs each configured to display one or more images for the virtual reality environment, and the input circuitry 1210 can be configured to receive the gaze data from each of the respective HMDs via a wired or wireless communication. Alternatively, the first user may wear an HMD configured to display one or more images for the virtual reality environment and the second user may view a display unit (such as the display unit 850) configured to display one or more images for the virtual reality environment, in which case the input circuitry 1210 can be configured to receive the gaze data for the first user from the HMD and to receive the gaze data for the second user from a camera arranged with respect to the display unit 850 to detect eye movements of the second user. Therefore, the input circuitry 1220 can be configured to receive the gaze data for a given user from at least one of: an HMD configured to detect eye movements of a user wearing the HMD, a camera configured to detect eye movements of a user not wearing an HMD; and a processing device (e.g. a games console or a remote server) in communication with such an HMD and/or a camera. In a case where the data processing apparatus 1200 and the HMD and/or camera are provided locally with respect to each other (e.g. connected to the same local area network (LAN)), the input circuitry 1220 can be configured to receive gaze data directly from an HMD and/or a camera via a wireless (e.g. Bluetooth® wireless link) or wired communication. The data processing apparatus 1200 and the HMD and/or camera can be provided remotely with respect to each other, in which case the data processing apparatus 1200 can be configured to receive the gaze data for a given user via a remote processing device (for example, via a remote server).

Figure 12B:
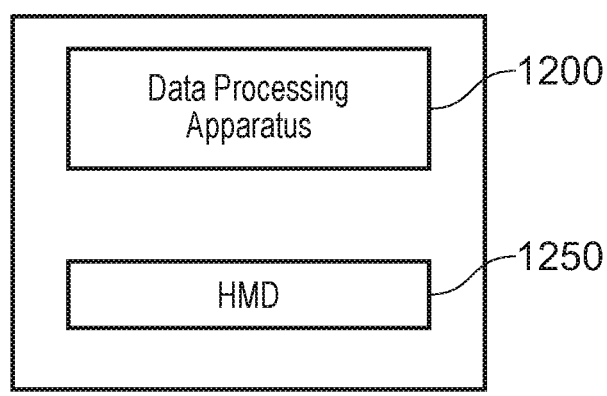
FIG. 12b schematically illustrates a system.

In embodiments of the disclosure, a system comprises the data processing apparatus 1200 and a head-mountable display (HMD) to output at least one of the video content and the audio content generated by the processing circuitry 1210 of the data processing apparatus 1200. FIG. 12b schematically illustrates an example of a system comprising the data processing apparatus 1200 and an HMD 1250, in which the data processing apparatus 1200 is configured to generate the audio and/or video content for output by the HMD 1250. The system comprises at least one HMD 1250 configured to be worn by a first user and to output at least one of the video content and the audio content generated by the data processing apparatus 1200 for the first user. It will be appreciated that whilst FIG. 12b illustrates a system in which audio and/or video content is generated for output by the HMD to the first user wearing the HMD 1250, in the case where the first user does not wear an HMD the audio and/or video content can be generated for output by one or more audio output units and a display unit, respectively, as discussed above. In the system of FIG. 12b, the data processing apparatus 1200 is configured to receive gaze data for two or more users and to generate at least one of audio content and video content for the virtual reality environment for output via the HMD 1250 to the first user. Optionally, the data processing apparatus 1200 may receive gaze data from the HMD 1250 worn by the first user. The data processing apparatus 1200 may receive gaze data from two or more other devices associated with two or more other users (e.g. two or more other HMDs worn by other users). For example, the first user wearing the HMD 1250 may be a spectator that does not actively participate in the virtual reality environment, and the audio and/or video content may be generated for output to the first user in dependence upon gaze data received for two or more users that actively participate in the virtual reality environment (e.g. players in the virtual reality environment). Alternatively, as discussed below, gaze data may be received for any user that views the virtual reality environment (including users that are spectators and users that actively participate in the virtual reality environment through a corresponding avatar) and in some embodiments the data processing apparatus 1200 is configured to generate the audio and/or video content for the HMD 1250 worn by the first user and to receive gaze data from the HMD 1250 worn by the first user.

In embodiments of the disclosure, the input circuitry 1220 is configured to receive the gaze data from the HMD 1250 indicative of the gaze point for the first user wearing the HMD 1250. The HMD 1250 comprises one or more cameras configured to detect movements of the eye of the first user wearing the HMD 1250. In some examples, the HMD 1250 comprises a single camera arranged to capture images of at least one of the first user's eyes. Alternatively, the HMD 1250 may comprise a first camera configured to capture images of one of the first user's eyes and a second camera configured to capture images of the other of the first user's eyes. The HMD 1250 is thus configured to detect the gaze direction of the eye(s) of the first user and to generate gaze data for the first user wearing the HMD 1250 indicative of a gaze point of the first user with respect to the virtual reality environment displayed by the display unit provided as part of the HMD 1250. The gaze data generated by the HMD 1250 can either be generated by a camera or a processor provided as part of the HMD 1250. The HMD 1250 is thus configured to detect the gaze point for the user and to output gaze data indicative of the point of gaze for the user with respect to the images of the virtual reality environment being displayed by the HMD 1250. It will be appreciated that the gaze point of the user detected by a camera can be defined relative to the camera or display unit of the head mounted display, relative to a reference point in the real-world environment in which the user is situated, and/or relative to the virtual environment that is being displayed by the head mounted display.

The data processing apparatus 1200 comprises the input circuitry 1220 configured to receive the gaze data from the HMD 1250 via a wired or wireless communication. The input circuitry 1220 can be configured to receive first gaze data from the HMD 1250 indicative of a gaze point for the first user wearing the HMD 1250 and to receive second gaze data indicative of a gaze point for a second user, where the second gaze data may be received from one of: a camera configured to capture images of the second user not wearing an HMD; another HMD 1250 worn by the second user; and a remote server in communication with the camera and/or the another HMD 1250. In the example shown in FIG. 12*b*, the data processing apparatus 1200 is configured to receive gaze data for two or more users, of which one of the two or more users wears the HMD 1250, and to generate audio and or video content for output to the first user by the HMD 1250 responsive to the gaze data for the two or more users.

It will be appreciated that the system illustrated in FIG. 12*b* can comprise a plurality of respective HMDs configured to be worn by respective users (not shown in FIG. 12*b*) such that the data processing apparatus 1200 generates audio and/or video content for output by a first HMD 1250 and a second HMD 1250. For example, the data processing apparatus 1200 can be configured to generate the same audio and video content for two or more respective HMDs so that the two or more respective users are provided with the same content. Alternatively, the data processing apparatus 1200 may be configured to generate first audio and/or first video content for output by a first HMD 1250 worn by a first user and to generate second audio and/or second video content for output by a second HMD 1250 worn by a second user. For example, the first user may have a corresponding first avatar within the virtual environment such that first audio and first video content is generated according to the position of the first avatar, whereas the second user may have a corresponding second avatar within the virtual environment such that second audio and second video content is generated according to the position of the second avatar.

The data processing apparatus 1200 can be configured to receive first gaze data indicative of a gaze point for a first user wearing the first HMD 1250 and second gaze data indicative of a gaze point for a second user wearing the second HMD 1250. The data processing apparatus 1200, the first HMD 1250 and the second HMD 1250 may be provided locally with respect to each other (e.g. connected to the same local area network (LAN)) such that the data processing apparatus 1200 is configured to communicate with the first and second HMDs 1250 via a wireless (e.g. Wi-Fi® or Bluetooth® wireless link) or wired communication to receive the gaze data from the first and second HMDs. Alternatively, the data processing apparatus 1200 and the first HMD 1250 may be provided locally with respect to each other, and the data processing apparatus 1200 and the second HMD 1250 may be provided remotely with respect to each other, such that the data processing apparatus 1200 is configured to communicate with the second HMD 1250 via one or more remote servers (for example, via the internet). Alternatively, the data processing apparatus 1200, the first HMD 1250 and the second HMD 1250 may each be provided remotely with respect to each other such that the data processing apparatus 1200 is configured to communicate with the first HMD 1250 and the second HMD 1250 via one or more remote servers. In this way, the data processing apparatus 1200 may for example be provided as part of a processing device (such as a server) configured to receive first gaze data from the first HMD 1250 worn by the first user and to receive second gaze data from the second HMD 1250 worn by the second user.

The gaze data for the two or more users with respect to the virtual reality environment provides an indication of where in the virtual reality environment each of the two or more users directs their gaze. In particular, the gaze data for a given user provides an indication of a position of the given user's gaze point in the virtual environment. The virtual reality environment comprises a plurality of virtual objects arranged within the virtual reality environment, in which each virtual object has an associated position within the virtual reality environment. Therefore, using the gaze data received by the input circuitry 1220, the selection circuitry 1230 can identify whether a position of the user's gaze point corresponds to a position of an object in the virtual environment. Each virtual object occupies a region of the virtual environment and references herein to a position of a virtual object refer to a position within the region of the virtual environment occupied by the virtual object. The selection circuitry 1220 can be configured to detect whether a position of a gaze point for a given user corresponds to a position of a given virtual object in the virtual reality environment. By using the gaze data indicative of a gaze point for each user, the selection circuitry 1230 can be configured to detect a number of the gaze points corresponding to a given virtual object in the virtual environment at a given time. The selection circuitry 1230 can thus be configured to select the given object in dependence upon the number of the gaze points corresponding to the given object in the virtual environment.

In a simplest case, the selection circuitry 1230 can be configured to select the given object depending on whether the number of the gaze points corresponding to the given virtual object at any given time is greater than or equal to a threshold number of gaze points. For example, in the case where the gaze data is received for two users, the threshold number may be set to have a value of two so that the selection circuitry 1230 selects an object when the gaze points for both users correspond to the same object. It will be appreciated that the gaze data may be received for N respective users (where N is an integer greater than or equal to two) and a value for the threshold number of gaze points may be set accordingly so that an object viewed by a threshold number of the N users can be selected by the selection circuitry 1230. For example, a value of two (or three, or four and so on) may be used for the threshold number of the gaze points so that when any two users (or three users, or four users and so on) among the N users view the same object, that object is selected by the selection circuitry 1230. Consequently, the input circuitry 1220 is configured to receive the gaze data for a number of users and the selection circuitry 1230 is configured to select one or more objects in the virtual reality environment in dependence upon the gaze data, and in some examples the selection circuitry 1220 can select a plurality of objects at the same time. Alternatively, in a case where the gaze data is received for N respective users, a value of N may be used for the threshold number of the gaze points that so that in this case the selection circuitry 1230 only selects an object when all of the N users view the same object. Hence more generally, the selection circuitry 1230 is configured to select at least one object in the virtual reality environment in dependence upon whether a number of the gaze points corresponding to the object satisfies a threshold condition.

A selection of an object by the selection circuitry 1230 indicates that at least a threshold number of the users are looking at a same object. In response to the selection of the object, the processing circuitry 1210 is configured to adapt the video content and/or the audio content for the virtual reality environment. In some embodiments, the processing circuitry 1210 is configured to adapt the video content by adapting an appearance of a selected object, as discussed later. Rather than adapting an appearance of a selected object, the video content may be adapted by generating an additional graphical object, such as a graphical icon (e.g. an arrow or other indicator), for indicating that the object in the virtual environment is currently selected by the selection circuitry 1230. In this way, one or more additional graphical objects may be generated for the virtual reality environment responsive to the selection by the selection circuitry 1230 to indicate one or more selected objects in the virtual environment. In some examples, the additional graphical object may be generated and positioned within an image in a manner that guides the user to the selected object by indicating to the user that the selected object is located to the left (or right) of the user's current field of view. Consequently, a user not currently looking at a selected object can be informed of the presence of one or more selected objects in the virtual environment (where the selected objects represents objects viewed by at least a threshold number of users), so that one or more objects which are likely to be of interest are can be visually distinguishable within the virtual reality environment.

The processing circuitry 1210 can be configured to adapt the audio content for the virtual reality environment so as to improve perception of one or more audio signals associated with a selected object in the virtual reality environment. In some examples, the processing circuitry 1210 is configured to adapt a volume of a background music for the virtual reality environment is response to a selection of an object by the selection circuitry 1230. The processing circuitry 1210 may adapt a volume of an audio signal associated with the background music by decreasing the volume of the audio signal (or in some cases by muting the audio signal) in response to a selection of an object so as to improve perception of one or more audio signals associated with a selected object. Similarly, in response to the selection circuitry 1230 stopping the selection of the object (de-selecting the object when the number of gaze points corresponding to the selected object no longer satisfies the threshold condition for selection) the processing circuitry 1210 can be configured to increase the volume of an audio signal associated with the background music. In some examples, the processing circuitry 1210 can be configured to generate an audio notification in response to a selection of an object by the selection circuitry 1230. An audio notification may comprise one or more of: a first predetermined sound (e.g. a notification tone) indicating selection of an object, a second predetermined sound indicating de-selection of an object; and one or more speech sounds. In some cases, the speech sound may comprise one or more words that are indicative of one or more properties or a name associated with the object selected by the selection circuitry. For example, in the case where the selected object is a virtual avatar, an audio notification may be generated comprising one or more speech sounds indicative of a name associated with the avatar. Therefore, by generating the audio notification one or more users of the virtual environment can be informed of a presence of a selected object in the virtual environment which is likely to be of interest.

In embodiments of the disclosure, the selection circuitry 1230 is configured to select the object in dependence upon whether the number of the gaze points corresponding to the object is greater than or equal to the threshold number of gaze points for a predetermined period of time. The gaze data may be received for a number of users of the virtual reality environment, which in some cases may be a relatively large number such as ten users or even a hundred users. A user of the virtual reality environment refers to a user currently viewing the virtual reality environment. In some examples, each user of the virtual reality environment may have a corresponding avatar within the virtual reality environment, or some users may have a corresponding avatar such that they actively participate in the virtual reality environment whilst other users viewing the virtual reality environment do not have a corresponding avatar and observe whilst not actively participating. In other examples, the virtual reality environment may be a virtual reality content in which all users observe the virtual reality environment from a same viewpoint (e.g. a virtual reality movie). When observing a virtual reality environment, each user typically scans the virtual reality environment with their eyes by performing a number of saccades to focus on respective objects within the virtual reality environment. In particular, in a relatively crowded virtual reality environment, a number of respective users may look at the same object for a relatively short period of time while scanning the environment with their eyes, and as such at any given time a number of users may briefly look at the same object. Therefore, in some embodiments in addition to requiring that at least a threshold number of users have a gaze point corresponding to an object, the selection circuitry 1230 also requires that the number of gaze points corresponding to the object is greater than or equal to the threshold number for at least a predetermined period of time. For example, a value of 3 seconds may be used for the predetermined period of time such that when the number of gaze points corresponding to an object is greater than or equal to the threshold number of gaze points for 3 seconds, the selection circuitry 1230 is configured to select the object. Once selected, the object remains selected until the number of gaze points corresponding to the object no longer satisfies the threshold condition for selection. In this way, the likelihood of erroneously selecting an object can be reduced and the likelihood of appropriately selecting one or more objects that are of interest for the users of the virtual reality environment is improved. In some examples, the predetermined period of time may be selected in dependence upon a number of respective users for the virtual reality environment, so that a larger period of time is used for a virtual reality environment having a larger number of users whereas a smaller period of time is used for a virtual reality environment having a smaller number of users.

In embodiments of the disclosure, the threshold number of gaze points is dependent upon a number of respective users for the virtual environment, in which the input circuitry 1220 is configured to receive the gaze data for each of the respective users. The threshold number of gaze points used for object selection may vary in dependence upon how many users there are for the virtual reality environment. In some examples, the number of users participating in a given virtual reality environment may vary as some users leave the environment and other users join the environment. The selection circuitry 1230 can be configured to select a value for the threshold number of gaze points from a plurality of values for the threshold number of gaze points in dependence upon the number of respective users for the virtual reality environment. For example, the selection circuitry 1230 can be configured to select a first value (e.g. 2) for the threshold number of gaze points when the number of users is less than or equal to a first number of users (e.g. 4 users), and to select a second value (e.g. 10) for the threshold number of gaze points when the number of users is greater than the first number of users and less than or equal to a second number of users (e.g. 30). Alternatively, in some examples the selection circuitry can be configured to select a value for the threshold number of gaze points corresponding to a predetermined proportion of the number of users for the virtual reality environment. For example, the selection circuitry 1230 can be configured to select the value for the threshold number of gaze points to correspond to half (or a quarter, or a tenth, for example) of the number of users participating the virtual reality environment. Hence more generally, a value for the threshold number of gaze points can be selected responsive to changes in the number of respective users for the virtual reality environment, and as such the condition used for object selection can be adapted for the number of users participating in the virtual reality environment.

In embodiments of the disclosure, the processing circuitry 1210 is configured to increase a volume of an audio signal associated with the object in response to the selection of the object. As discussed previously, the processing circuitry 1210 can adapt the audio content in a manner that improves perception of one or more audio signals associated with one or more selected objects in the virtual reality environment. One way in which this can be achieved is by changing a volume of one or more audio signals associated with an object in response to the object being selected. For a virtual reality environment comprising a plurality of objects, one or more of the objects may each represent a sound source that emits sounds within the environment. For example, for an object such as a virtual car, one or more audio signals associated with the car may define one or more associated sounds such as an engine sound, a tyre screeching sound and a door closing/opening sound that are emitted from the virtual car. Similarly, for an object such as a virtual avatar, one or more audio signals associated with the virtual avatar may define one or more associated sounds such as a voice sound associated with the avatar, a footsteps sound and a weapon sound associated with the avatar. In response to the selection circuitry 1230 selecting a given object within the virtual environment, the processing circuitry 1210 can be configured to increase a volume for one or more audio signals associated with the selected object so that one or more sounds emitted by the selected object have an increased loudness relative to the when the object was not selected. In this way, one or more audio signals associated with the selected object can be increased in volume relative to the other audio signals associated with other non-selected objects in the virtual reality environment to improve perception of the audio signals associated with the selected object.

In embodiments of the disclosure, the processing circuitry 1210 is configured to decrease a volume for one or more audio signals associated with one or more other objects in the virtual reality environment not selected by the selection circuitry 1230, in response to the selection of the object. Alternatively or in addition to increasing a volume for one or more audio signals associated with an object in response to the selection of that object, the processing circuitry 1210 can be configured to decrease a volume for one or more audio signals associated with one or more other objects not selected by the selection circuitry 1220. Therefore, one or more audio signals associated with the selected object can be increased in volume relative to the other audio signals for the virtual environment by decreasing a volume for one or more audio signals associated with one or more of the other objects not selected by the selection circuitry 1230 and/or increasing a volume for one or more audio signals associated with the selected object. In some examples, the processing circuitry 1210 can be configured to decrease a volume for one or more audio signals associated with one or more other objects that are within a predetermined distance of a selected object. In this way, rather than reducing a loudness associated with each non-selected object in the virtual environment, one or more non-selected objects that are closest to the selected object (within the predetermined distance) can have their associated audio signals reduced in volume to reduce auditory masking of one or more of the sounds emitted from the selected object.

In embodiments of the disclosure, the processing circuitry 1210 is configured to generate the audio content for the virtual reality environment for a first user corresponding to a first avatar in the virtual reality environment in dependence upon a position of the first avatar, a position of the selected object and a position of one or more other objects not selected by the selection circuitry in the virtual reality environment. In some embodiments, the first user has a virtual avatar within the virtual reality environment such that the video content and/or audio content is generated for output to the first user in accordance with the position of the virtual avatar in the virtual reality environment. For example, as the virtual avatar turns within the virtual reality environment to face a different portion of the virtual reality environment, the data processing apparatus 1200 generates images in accordance with the change in the viewpoint position for the virtual avatar in the virtual reality environment. The virtual avatar corresponding to the first user has a position in the virtual reality environment which can change as the avatar moves within the virtual reality environment. In addition to the first avatar corresponding to the first user, the virtual reality environment further comprises at least one object selected by the selection circuitry 1230 in dependence upon the gaze data for two or more users and one or more other objects not selected by the selection circuitry 1230. The selected object may for example be another avatar in the virtual environment which may correspond to another user or may correspond to a non-player character (NPC), or the selected object may be an object such as a car, a tree or a weapon within the virtual reality environment. Similarly, the one or more other objects not selected by the selection circuitry 1230 may comprise one or more other avatars corresponding to other users of the virtual environment and/or one or more other avatars corresponding to non-player characters and/or one or more other graphical objects within the virtual reality environment. The selected object has one or more associated audio signals and at least one of the one or more other objects also has one or more associated audio signals. The processing circuitry 1210 is configured to generate the audio content for the virtual reality environment for output to the first user (for example, for output by an HMD worn by the first user) in which the audio content comprises the one or more audio signals associated with the selected object and the one or more audio signals associated with at least one other object not selected by the selection circuitry 1230. The audio content generated for the first user thus comprises a plurality of audio signals, in which an audio signal for the selected object is adapted responsive to the object being selected and at least some of the other audio signals have a volume that is dependent upon a distance between a position of an object representing a source of the audio signal and a position of the first avatar corresponding to the first user in the virtual reality environment.

In embodiments of the disclosure, the processing circuitry 1210 is configured to calculate a weighting parameter for an audio signal associated with at least one of the other objects in the virtual reality environment not selected by the selection circuitry in dependence upon a distance between the position of the other object and the position of the first avatar. The processing circuitry 1210 can be configured to calculate a distance (virtual distance) between a position of a virtual object not selected by the selection circuitry 1230 and a position of the first avatar. The processing circuitry 1210 can therefore calculate a weighting parameter for an audio signal associated with the non-selected virtual object in dependence upon the distance between the two positions in the virtual environment. In particular, the processing circuitry 1210 is configured to calculate a value for the weighting parameter such that a larger value is calculated for a smaller separation distance between the first avatar and the object not selected by the selection circuitry 1230, and a smaller value is calculated for a larger separation distance. The processing circuitry 1210 can thus be configured to generate a first audio signal associated with a first non-selected object positioned at a first distance from the first avatar using a larger weighting parameter and to generate a second audio signal associated with a second non-selected object positioned at a second distance from the first avatar using a smaller weighting parameter, where the first distance is smaller than the second distance. The processing circuitry 1210 is configured to generate the audio content for the virtual reality environment for the first user by generating one or more audio signals associated with one or more objects not selected by the selection circuitry 1230 using one or more weighting parameters calculated for one or more of the objects. In this way, distance-based weighting of the audio signals associated with the respective objects can be implemented. In addition, a direction of a viewpoint for the first avatar with respect to an object may in some examples be used to calculate a direction-based weighting parameter for an audio signal associated with the object.

In embodiments of the disclosure, the processing circuitry 1210 is configured to select a first predetermined weighting parameter for one or more audio signals associated with one or more of the other objects in the virtual reality environment not selected by the selection circuitry and not within a predetermined distance of the position of the first avatar. For one or more non-selected objects (not selected by the selection circuitry 1230) that are not within the predetermined distance of the position of the first avatar, the processing circuitry 1210 can be configured to select a first predetermined weighting parameter for use in generating one or more audio signals for the one or more non-selected objects. In this way, for objects that are positioned more than the predetermined distance from the first avatar, rather than calculating a distance between the first avatar and one or more objects to calculate a distance-based weighting parameter, the selection circuitry 1210 can use a first predetermined weighting parameter. Therefore, each of the non-selected objects located more than the predetermined distance from the first avatar, the audio signals can be generated using the same weighting parameter such that background sounds can be generated in a computationally efficient manner. This allows the audio signals for non-selected objects that are not within the predetermined distance to be lowered in volume and this can allow audio signals associated with nearby non-selected objects (e.g. nearby non-selected avatars) within the predetermined distance to be more easily perceived by the first user. This can allow conversations between nearby avatars while lowering the volume for other avatars not within the predetermined distance to facilitate conversations between nearby avatars.

In embodiments of the disclosure, the processing circuitry 1210 is configured to cull one or more audio signals associated with one or more of the other objects in the virtual reality environment not selected by the selection circuitry 1230 and not within a predetermined distance of the position of the first avatar. Whilst the processing circuitry 1210 may calculate a distance between the first avatar and one or more objects to calculate a distance-based weighting parameter for an audio signal associated with an object and/or select a predetermined weighting parameter for use in generating one or more audio signals for the one or more non-selected objects not within a predetermined distance of the first avatar, in some embodiments the processing circuitry 1210 is configured to only generate audio signals associated with the one or more objects within the predetermined distance of the first avatar. By culling audio signals according to whether an object is within the predetermined distance of the first avatar, the number of audio signals generated for output to the first user can be reduced while maintaining the audio signals that are of most importance for the user's experience. This can allow the audio signals for non-selected objects that are not within the predetermined distance to be removed from the audio content for the first user and this can allow audio signals associated with nearby non-selected objects within the predetermined distance to be more easily perceived by the first user.

In embodiments of the disclosure, the processing circuitry 1210 is configured to increase a volume of an audio signal associated with the selected object by selecting a second predetermined weighting parameter for the selected object. In the following discussion the term "second predetermined weighting parameter" is used to distinguish from the "first predetermined weighting parameter" discussed previously. The second predetermined weighting parameter is selected for use in weighting an audio signal for a selected object, whereas the first predetermined weighting parameter is used for weighting an audio signal for a non-selected object. In response to an object being selected by the selection circuitry 1230, the processing circuitry 1210 can be configured to increase a volume for one or more audio signals associated with the selected object. As such, for a situation in which a given object is initially not selected at a time T1 and is subsequently selected by the selection circuitry 1230 at a time T2 (T2 is later in time than T1), at the time T1 a given audio signal associated with the object has a first volume and in response to the object being selected the volume of the given audio signal is increased such that at the time T2 the given audio signal has a second volume. It will be appreciated that in response to the object being de-selected by the selection circuitry 1230 the volume of the given audio signal may revert to the first value used prior to the selection, or in some cases may be adjusted to have a volume that is lower than the first volume as discussed later. Therefore, in the case where the object is not selected a distance-based weighting parameter may be calculated for the object, and in response to the object being selected the second predetermined weighting parameter can be automatically selected for use in generating the audio signals for the selected object instead of using the distance-based weighting parameter, in which the use of the second predetermined weighting parameter causes the volume of the audio signal to be increased. Therefore, the second predetermined weighting parameter used for a selected object has a value that is independent of the distance between the selected object and the first avatar, such that one or more audio signals for the selected object can be generated for output to the first user irrespective of the distance in virtual reality environment between the selected object and the first avatar and with a volume that is increased relative to volume prior to the selection of the object.

Figure 13:
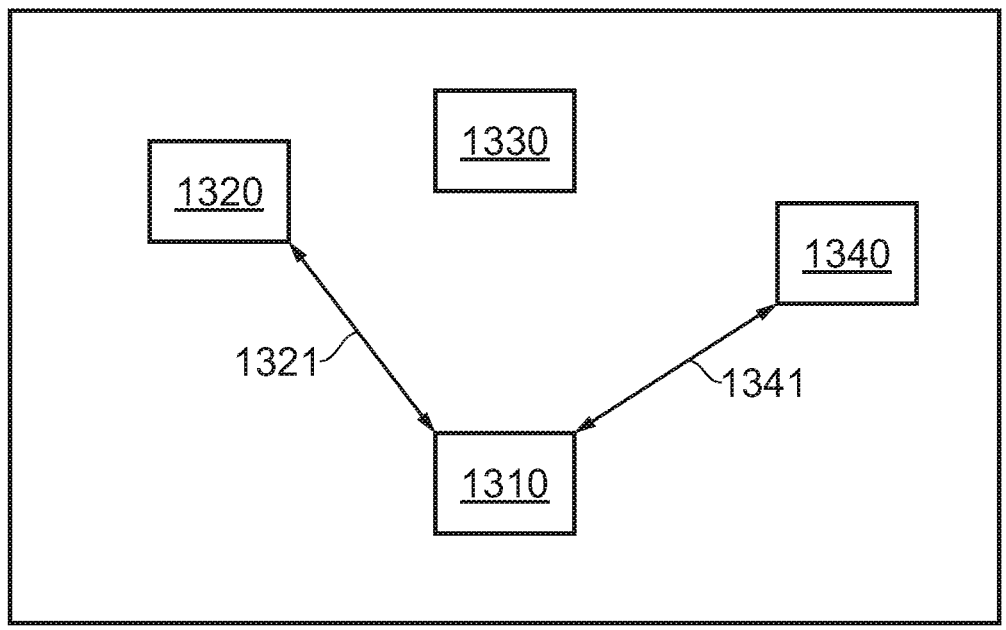
FIG. 13 schematically illustrates an example of a virtual reality environment comprising a plurality of objects.

FIG. 13 schematically illustrates an example of a virtual reality environment comprising the first avatar 1310 corresponding to the first user and objects 1320, 1330 and 1340. In the example shown, the object 1330 is a "selected object" that is currently selected by the selection circuitry 1230 because the number of gaze points corresponding to the object 1330 satisfies the threshold condition for object selection, whereas the object 1320 and the object 1340 are not selected by the selection circuitry 1230. In response to the selection of the object 1330 the processing circuitry 1210 is configured to select the second predetermined weighting parameter for use in generating the one or more audio signals associated with the object 1330 for output to the first user corresponding to the first avatar. The second predetermined weighting parameter has a value that is set in advance and is used for applying a weighting to an audio signal associated with the selected object such that the audio signal can be weighted irrespective of the distance between the selected object 1330 and the first avatar 1310. Also, the processing circuitry 1210 can be configured to calculate a first weighting parameter for the audio signal(s) associated with the object 1310 depending on the distance 1321 and a second weighting parameter for the audio signal(s) associated with the object 1340 depending on the distance 1341. Therefore, in the example shown whilst the audio signals associated with the objects 1320 and 1340 are weighted according to their distance from the first avatar, the one or more audio signals associated with the object 1330 are weighted according to the second predetermined weighting parameter such that the one or more audio signals have a greater volume once the object 1330 is selected compared to when the object 1330 is not selected thereby improving perception of the audio signals associated with the object 1330 for the first user. For example, the second predetermined weighting parameter may have a value of 1.0, whereas using the distances 1321 and 1341 for the non-selected objects the calculated weighting parameters may have a value of 0.3 and 0.4, respectively (note that the distance 1321 is greater than the distance 1341 and therefore a smaller weighting parameter is calculated for the object 1320 and a larger weighting parameter is calculated for the object 1340, in which a larger weighting factor corresponds to a larger volume for the audio signal). Consequently, perception of the audio signals associated with the selected object 1330 can be enhanced by using the second predetermined weighting factor. Moreover, even though the selected object 1330 is positioned further away from the first avatar than the objects 1320 and 1340, due to the relative weightings the audio signals associated with the selected object 1330 can be generated for output to the first user with a volume greater than a volume of the audio signals associated with objects 1320 and 1340.

In embodiments of the disclosure, the processing circuitry 1210 is configured to select the second predetermined weighting parameter from a plurality of second predetermined weighting parameters in dependence upon the number of the gaze points corresponding to the selected object. As discussed previously, the selection circuitry 1230 is configured to select an object when the number of gaze points corresponding to the object is greater than or equal to a threshold number of gaze points. In response to selecting the object, the processing circuitry 1210 is configured to select a second predetermined weighting factor for weighting an audio signal emitted by the object. However, once the object is selected, the number of gaze points corresponding to the selected object may vary whilst continuing to satisfy the threshold condition used for object selection. Therefore, the processing circuitry 1210 can be configured to select a second predetermined weighting parameter from a plurality of second predetermined weighting parameters in accordance with changes in the number of gaze points so as to vary a weighting for the audio signals associated with the selected object according to changes in the number of gaze points. This may be achieved by comparing the number of gaze points corresponding to the selected object with respective thresholds.

A threshold number of gaze points used for deciding whether to select an object may be set to a value of X (e.g. X=5 gaze points), and once the object is selected the number of gaze points corresponding to the object may increase to Y gaze points, where Y is greater than X (e.g. Y=20 gaze points). For example, a second predetermined weighting factor having a value of A (e.g. 1.0) may be selected in response to detecting that the number of gaze points corresponding to the object is greater than or equal to the threshold number of gaze points (e.g. 5 gaze points) used for deciding whether to select an object, and a second predetermined weighting factor having a value of B (e.g. 1.5) may be selected in response to detecting that the number of gaze points corresponding to the selected object is greater than or equal to a second threshold number of gaze points (e.g. 15 gaze points), where the second threshold number is greater than the first threshold number. Therefore, changes in the number of gaze points corresponding to the selected object, which are indicative of changes in a level of user interest for the selected object, can be used to select a second predetermined weighting parameter from a plurality of second predetermined weighting parameters so that the selected object can be weighted differently according to how many users are looking at the selected object. A first threshold number of gaze points can be used for deciding whether to select an object and a second threshold number of gaze points can be used such that when the detected number of gaze points is greater than or equal to the second threshold number a second predetermined weighting factor corresponding to a higher weighting is selected for the weighting the audio signal. It will be appreciated that whilst the above example uses a first threshold and a second threshold to select the weighting parameter, the above example can be implemented using a plurality of such thresholds.

In embodiments of the disclosure, the selected object is an avatar in the virtual reality environment, the virtual reality environment comprising a plurality of avatars. As discussed previously, the virtual environment may comprise a plurality of avatars where an avatar may correspond to a user or may be a non-player character. In some examples, each avatar in the virtual reality environment corresponds to a user. The selection circuitry 1230 can be configured to select one or more avatars in the virtual reality environment in dependence upon the gaze data for the users of the virtual reality environment. By selecting an avatar, one or more audio signals associated with the selected avatar such as a speech signal and a movement signal associated with movement of the selected avatar (e.g. footsteps sounds) can be weighted so that the volume is increased for one or more of the audio signals. Therefore, audio signals for a selected avatar within a group of avatars can be adapted so that the avatar's audio signals become more noticeable for the other users. The selected avatar can therefore be heard more easily by the other users represented by their respective avatars within the group. For example, when a particular user is speaking, the attention of other users may be drawn to the avatar of that particular user thereby causing a selection of the avatar by the selection circuitry 1230 and in turn causing one or more audio signals associated with the avatar to be increased in volume relative to the other audio signals in the virtual reality environment. Consequently, for a group of avatars in which a number of respective avatars are talking at the same time, when one particular avatar is watched by at least a threshold number of users an audio signal for that particular avatar can be raised in volume with respect to the other audio signals associated with the other avatars in the group to thereby enhance communication between the users in a virtual reality environment. It will be appreciated that in some examples more than one avatar within the group may be selected at any given time.

In embodiments of the disclosure, the processing circuitry 1210 is configured to adapt an appearance of the object in response to the selection of the object. The processing circuitry 1210 can be configured to generate images representing the virtual reality environment, in which a visual appearance of object can be modified when the selection circuitry 1230 selects the object so that the appearance of the object prior to selection is different to the appearance of the object once it is selected. By adapting the video content in response to the selection of the object, a user viewing the video content can identify the presence of one or more selected objects in the virtual reality environment which are viewed by at least a threshold number of users. Referring to the example above of a group of avatars, in response to selecting one of the avatars the appearance of the avatar can be adapted so that other users in the group of avatar can visually identify which avatar in the group is being watched by at least a threshold number of users. In addition to adapting the appearance of the avatar, the audio signals for the selected avatar may be adapted. By adapting both the appearance of the selected avatar and an associated audio signal, a user in the virtual reality environment may be able to more easily identify an avatar that is responsible for the audio signals having the increased volume.

In embodiments of the disclosure, the processing circuitry 1210 is configured to adapt one or more of a size, colour, brightness and position of the object. The processing circuitry 1210 can be configured to increase a size of the object such that once selected the object is larger in size compared to when the object is not selected. Referring to the example above of a group of avatars, by increasing the size of the avatar in response to the avatar being selected, other users can readily identify the selected avatar. The processing circuitry 1210 can be configured to increase a brightness of the object such that the luminance of the object is high when selected compared to when not selected. This may for example be achieved by adapting the R, G, B values in response to the object being selected using one or more scaling parameters. The processing circuitry 1210 can be configured to adapt a colour of the object in response to the selection of the object. For example, a predetermined colour (e.g. red) may be used for the selected object so that objects having the predetermined colour are readily identifiable as being selected objects. In some examples, the predetermined colour may be used to draw a shape corresponding to an outline for the selected object. The processing circuitry 1210 can be configured to change a position of the object within the virtual reality environment in response to the selection of the object. For example, the position of the selected object may be adjusted to move the selected object towards the position of the first avatar and/or towards a centre of the field of view for the first avatar.

In embodiments of the disclosure, the processing circuitry 1210 is configured to adapt the size of the selected object in response to changes in the number of the gaze points corresponding to the selected object. The selection circuitry 1230 is configured to select an object when the number of gaze points corresponding to the object is greater than or equal to a threshold number of gaze points. In response to selecting the object, the processing circuitry 1210 is configured to increase a size of the object. However, once the object is selected, the number of gaze points corresponding to the selected object may vary whilst continuing to satisfy the threshold condition used for object selection. Therefore, the processing circuitry 1210 can be configured to change the size of the selected object in accordance with changes in the number of gaze points. This may be achieved by comparing the number of gaze points corresponding to the selected object with respective thresholds for the number of gaze points. For example, by using a first threshold number of gaze points for object selection of X gaze points and a second threshold number of gaze points, when the number of gaze points is less than the second threshold number of gaze points a first size can be selected for use in generating images of the selected object and when the number of gaze points is greater than or equal to the second threshold number a second size larger than the first size can be selected for use in generating images of the selected object. It will be appreciated that whilst the above example uses a first threshold and a second threshold, the above example can be implemented using a plurality of such thresholds to achieve a plurality of different sizes for the selected object.

In embodiments of the disclosure, the selection circuitry 1230 is configured to de-select the selected object in dependence upon whether the number of the gaze points corresponding to the object is less than a threshold number of gaze points for a predetermined period of time and the processing circuitry is configured to set a size for the de-selected object in dependence upon a rate of change in the number of the gaze points corresponding to the object at a time when the object is selected. The selection of the selected object by the selection circuitry 1230 is dependent upon the number of gaze points satisfying the threshold condition for selection. The selection circuitry 1230 is configured to stop the selection of an object (de-select a selected object) when the number of gaze points corresponding to that object ceases to satisfy the threshold condition. When the selection circuitry 1230 de-selects the object, the object can be returned to its original state (appearance and volume of the audio signals) prior to when it was selected. However, in some embodiments when the object is de-selected, the processing circuitry 1210 can be configured to set an appearance of the de-selected object depending on a rate of change in the number of the gaze points prior to the object being de-selected. For example, a particular avatar in a group of avatars may be being watched by the other avatars in a group, and when the particular avatar is no longer of interest because the particular avatar has finished speaking the other users will typically direct their gaze away from the particular avatar within a relatively short period of time so that the number of gaze points corresponding to the particular avatar no longer satisfies the threshold condition for object selection. The selection circuitry 1210 can be configured to detect the rate of change in the number of the gaze points corresponding to the object and the processing circuitry 1210 can be configured to set one or more properties of the appearance of the object once the object is de-selected in dependence upon the rate of change in the number of the gaze points, in which at least one of the properties includes a size of the object. For example, when the detected rate of change exceeds a threshold rate of change (e.g. ±N gaze points per second), the processing circuitry 1210 can be configured to set the size of the de-selected object so that the size is smaller than the original size of the object prior to when it was originally selected. In this way, when a level of interest for a particular selected object drops at a rate exceeding the threshold rate, the size of the object can be set so that the de-selected object is displayed with a smaller size and therefore a diminished presence in the virtual reality environment. This may therefore provide an indication of one or more previously and no longer selected objects in the virtual reality environment.

Figure 14:
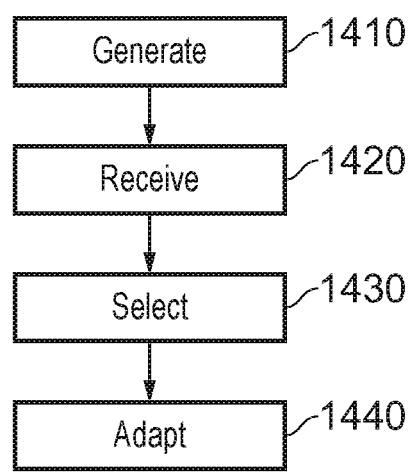
FIG. 14 is a schematic flowchart illustrating a method for adapting at least one of video content and audio content for a virtual reality environment.

Referring now to FIG. 14, in embodiments of the disclosure a data processing method comprises:

generating (at a step 1410) at least one of video content and audio content for a virtual reality environment;

receiving (at a step 1420) gaze data for two or more users indicative of gaze points with respect to the virtual reality environment;

selecting (at a step 1430) at least one object in the virtual reality environment in dependence upon a number of the gaze points corresponding to the object; and adapting (at a step 1440) at least one of the video content and the audio content in response to selecting the object.

It will be appreciated that example embodiments can be implemented by computer software operating on a general purpose computing system such as a games machine. In these examples, computer software, which when executed by a computer, causes the computer to carry out any of the methods discussed above is considered as an embodiment of the present disclosure. Similarly, embodiments of the disclosure are provided by a non-transitory, machine-readable storage medium which stores such computer software.

It will also be apparent that numerous modifications and variations of the present disclosure are possible in light of the above teachings. It is therefore to be understood that within the scope of the appended claims, the disclosure may be practised otherwise than as specifically described herein.

The foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A data processing apparatus, comprising:
   processing circuitry to generate at least one of video content and audio content for a virtual reality environment;
   input circuitry to receive gaze data for two or more users indicative of a gaze point for each user with respect to the virtual reality environment; and
   selection circuitry to select at least one object in the virtual reality environment in dependence upon two or more of the gaze points corresponding to the object, in which the processing circuitry is configured to adapt at least one of the video content and the audio content in response to the selection of the object.

2. The data processing apparatus according to claim 1, in which the processing circuitry is configured to increase a volume of an audio signal associated with the object in response to the selection of the object.

3. The data processing apparatus according to claim 1, in which the processing circuitry is configured to decrease a volume for one or more audio signals associated with one or more other objects in the virtual reality environment not selected by the selection circuitry, in response to the selection of the object.

4. The data processing apparatus according to claim 1, in which the selected object is an avatar in the virtual reality environment, the virtual reality environment comprising a plurality of avatars.

5. The data processing apparatus according to claim 1, in which the selection circuitry is configured to select the object in dependence upon whether the number of the gaze points corresponding to the object is greater than or equal to a threshold number of gaze points for a predetermined period of time.

6. The data processing apparatus according to claim 5, in which the threshold number of gaze points is dependent upon a number of respective users for the virtual environment, in which the input circuitry is configured to receive the gaze data for each of the respective users.

7. The data processing apparatus according to claim 1, in which the processing circuitry is configured to generate the audio content for the virtual reality environment for a first user corresponding to a first avatar in the virtual reality environment in dependence upon a position of the first avatar, a position of the selected object and a position of one or more other objects not selected by the selection circuitry in the virtual reality environment.

8. The data processing apparatus according to claim 7, in which the processing circuitry is configured to calculate a weighting parameter for an audio signal associated with at least one of the other objects in the virtual reality environment not selected by the selection circuitry in dependence upon a distance between the position of the other object and the position of the first avatar.

9. The data processing apparatus according to claim 7, in which the processing circuitry is configured to select a first predetermined weighting parameter for one or more audio signals associated with one or more of the other objects in the virtual reality environment not selected by the selection circuitry and not within a predetermined distance of the position of the first avatar.

10. The data processing apparatus according to claim 7, in which the processing circuitry is configured to cull one or more audio signals associated with one or more of the other objects in the virtual reality environment not selected by the selection circuitry and not within a predetermined distance of the position of the first avatar.

11. The data processing apparatus according to claim 7, in which the processing circuitry is configured to increase a volume of an audio signal associated with the selected object by selecting a second predetermined weighting parameter for the selected object.

12. The data processing apparatus according to claim 11, in which the processing circuitry is configured to select the second predetermined weighting parameter from a plurality of second predetermined weighting parameters in dependence upon the number of the gaze points corresponding to the selected object.

13. The data processing apparatus according to claim 1, in which the processing circuitry is configured to adapt an appearance of the object in response to the selection of the object.

14. The data processing apparatus according to claim 13, in which the processing circuitry is configured to adapt one or more of a size, colour, brightness and position of the selected object.

15. The data processing apparatus according to claim 14, in which the processing circuitry is configured to adapt the size of the selected object in response to changes in the number of the gaze points corresponding to the selected object.

16. The data processing apparatus according to claim 15, in which the selection circuitry is configured to de-select the selected object in dependence upon whether the number of the gaze points corresponding to the object is less than a threshold number of gaze points for a predetermined period of time and the processing circuitry is configured to set a size for the de-selected object in dependence upon a rate of change in the number of the gaze points corresponding to the object at a time when the object is selected.

17. A system, comprising:
a data processing apparatus including:
processing circuitry to generate at least one of video content and audio content for a virtual reality environment,
input circuitry to receive gaze data for two or more users indicative of a gaze point for each user with respect to the virtual reality environment, and
selection circuitry to select at least one object in the virtual reality environment in dependence upon two or more of the gaze points corresponding to the object, in which the processing circuitry is configured to adapt at least one of the video content and the audio content in response to the selection of the object; and
a head-mountable display (HMD) configured to be worn by a user and to output at least one of the video content and the audio content generated by the processing circuitry.

18. The system according to claim 17, in which the input circuitry is configured to receive the gaze data from the HMD indicative of the gaze point for the user wearing the HMD.

19. The system according to claim 17, comprising:
another HMD configured to be worn by another user, in which the input circuitry is configured to receive the gaze data from the another HMD indicative of the gaze point for the another user wearing the another HMD.

20. A data processing method, comprising the steps of:
generating at least one of video content and audio content for a virtual reality environment;
receiving gaze data for two or more users indicative of gaze points with respect to the virtual reality environment;
selecting at least one object in the virtual reality environment in dependence upon two or more of the gaze points corresponding to the object; and
adapting at least one of the video content and the audio content in response to selecting the object.

21. A non-transitory, computer-readable storage medium containing computer software which, when executed by a computer, causes the computer to perform a data processing method by carrying out actions, comprising:
generating at least one of video content and audio content for a virtual reality environment;
receiving gaze data for two or more users indicative of gaze points with respect to the virtual reality environment;
selecting at least one object in the virtual reality environment in dependence upon two or more of the gaze points corresponding to the object; and
adapting at least one of the video content and the audio content in response to selecting the object.

* * * * *